US012653216B2

(12) United States Patent
Lee et al.

(10) Patent No.: US 12,653,216 B2
(45) Date of Patent: Jun. 16, 2026

(54) FLAVORING AGENT, FLAVORING AGENT COMPOSITION AND ARTICLE COMPRISING SAME

(71) Applicant: KT&G CORPORATION, Daejeon (KR)

(72) Inventors: Changgook Lee, Daejeon (KR); Geon Chang Lee, Daejeon (KR); Dong Hyun Kim, Daejeon (KR); Ick Joong Kim, Daejeon (KR); In Beom Song, Daejeon (KR); Ho Rim Song, Daejeon (KR); Ji Seob Woo, Daejeon (KR); Kyung Bin Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 590 days.

(21) Appl. No.: 18/034,916

(22) PCT Filed: Nov. 17, 2022

(86) PCT No.: PCT/KR2022/018176
§ 371 (c)(1),
(2) Date: May 2, 2023

(87) PCT Pub. No.: WO2023/090886
PCT Pub. Date: May 25, 2023

(65) Prior Publication Data

US 2024/0341335 A1 Oct. 17, 2024

(30) Foreign Application Priority Data

Nov. 18, 2021 (KR) ........................ 10-2021-0159809

(51) Int. Cl.
*A23L 27/20* (2016.01)
*A24B 15/38* (2006.01)

(52) U.S. Cl.
CPC ........ *A23L 27/2052* (2016.08); *A24B 15/385* (2013.01)

(58) Field of Classification Search
None
See application file for complete search history.

(56) References Cited

U.S. PATENT DOCUMENTS

| | | | | |
|---|---|---|---|---|
| 3,332,428 A | | 7/1967 | Mold et al. | |
| 4,127,601 A | | 11/1978 | Grubbs et al. | |
| 5,139,034 A | * | 8/1992 | Chan .................... | A24B 15/403 131/277 |

FOREIGN PATENT DOCUMENTS

| | | |
|---|---|---|
| CN | 102311464 A | 1/2012 |
| CN | 102311465 A | 1/2012 |

(Continued)

OTHER PUBLICATIONS

Communication dated Dec. 12, 2024 issued by the Russian Patent Office in application No. 2023112273/04.

(Continued)

*Primary Examiner* — Michael J Felton
(74) *Attorney, Agent, or Firm* — Sughrue Mion, PLLC

(57) ABSTRACT

The present disclosure relates to a novel flavoring agent, a flavoring agent composition, and an article including the same, and more particularly, to a flavoring agent as a compound that includes a moiety derived from a sugar compound and a moiety derived from a flavoring compound in a basic backbone and is pyrolyzed into a lactone compound, a sugar compound, and a flavoring compound upon pyrolysis, and a composition and an article including the same.

18 Claims, 26 Drawing Sheets

(56) References Cited

FOREIGN PATENT DOCUMENTS

| | | | |
|---|---|---|---|
| CN | 102336789 | A | 2/2012 |
| KR | 10-2009-0045925 | A | 5/2009 |
| KR | 10-2011-0106221 | A | 9/2011 |
| RU | 2007 120 504 | A | 12/2008 |
| WO | 2011/042210 | A2 | 4/2011 |

OTHER PUBLICATIONS

International Search Report for PCT/KR2022/018176 dated Feb. 22, 2023.

* cited by examiner

FLAVORING AGENT, FLAVORING AGENT COMPOSITION AND ARTICLE COMPRISING SAME

CROSS REFERENCE TO RELATED APPLICATIONS

This application is a National Stage if International Application No. PCT/KR2022/018176 filed Nov. 17, 2022, claiming priority based on Korean Patent Application No. 10-2021-0159809 filed Nov. 18, 2021.

TECHNICAL FIELD

The present disclosure relates to a novel flavoring agent from which flavoring components are released by heat, a flavoring agent composition, and an article including the same.

BACKGROUND ART

Flavoring agents may be added to food and a smoking article to further enhance the taste. Smoke or aerosol generated from the smoking article moves from upstream to downstream and is delivered to a smoker to be produced so as to feel the satisfaction of smoking. There are many factors that determine smoking satisfaction, but the most important factor is the cigarette taste that the smoker feels. Smokers want to enjoy a variety of tobacco tastes in one smoking article, and thus cigarette manufacturers add flavoring substances (e.g., flavoring agents) to satisfy smokers' desires so that the smokers can feel various flavors or tastes.

In existing flavoring agents, the possibility of decomposition of chemical structures is high at room temperature during long-term storage of smoking media, and flavoring components are volatilized, so that it is difficult to develop sufficient flavor to enhance the tobacco taste during smoking or the persistence of the flavor is weak or the tobacco taste changes as the smoking time elapses. Accordingly, it is necessary to develop flavoring agents capable of increasing smoking satisfaction during smoking. Flavoring agents are applied to foods to add various flavors, but when the food is processed and/or stored for a long period of time, the flavor is frequently volatilized and released and disappears. Accordingly, it is necessary to develop a flavoring agent that increases the storage life by preventing or delaying the release of volatile flavors, and can achieve sufficient flavor development when used by consumers.

Disclosure of the Invention

Technical Goals

Existing compounds having a flavoring agent function have low chemical and structural stability at room temperature (rt) or a temperature close thereto, so that structural transformation or decomposition may occur to volatilize flavoring components. An object of the present disclosure is to provide a novel flavoring agent, from which flavoring components are released by pyrolysis when heat is applied.

The present disclosure relates to a flavoring agent composition including the novel flavoring agent according to the present disclosure.

The present disclosure relates to an article including the novel flavoring agent according to the present disclosure.

However, technical objects of the present disclosure are not limited to the aforementioned purpose and other objects which are not mentioned may be clearly understood by those skilled in the art from the following description.

Technical Solutions

According to an embodiment of the present disclosure, there is provided a flavoring agent as a compound represented by Formula 1 below:

[Formula 1]

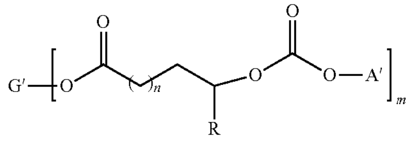

(In Formula 1 above, n is an integer of 1 or 2,

R is a straight-chain or branched-chain alkyl group having 1 to 30 carbon atoms, a moiety A' is a moiety derived from a flavoring compound having at least one of an aromatic ring, an aliphatic ring, and an aliphatic chain having a hydroxyl group (—OH), in which the hydroxyl group participates in a carbonate linkage (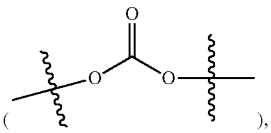 [SMILES: *OC(=O)O*]), and the moiety A' corresponds to a flavoring compound excluding the hydroxyl group participating in the carbonate linkage, and a moiety G' is a moiety derived from a sugar compound, in which at least one of hydroxyl groups (—OH) linked to a ring of the sugar compound participates in an ester linkage (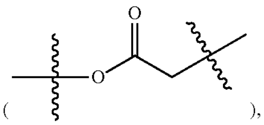 [SMILES: *CC(=O)O*]), G' corresponds to a sugar compound excluding the hydroxyl group participating in the ester linkage, and m is the number of

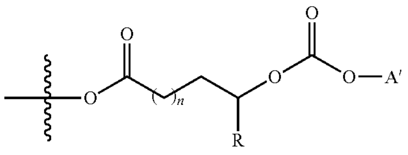

linked to the moiety G' by the ester linkage, and an integer of 1 to 8.)

According to an embodiment of the present disclosure, the flavoring compound may be selected from the group consisting of a cyclic monoterpene-based compound having a hydroxyl group, an acyclic monoterpene-based compound having a hydroxyl group, an aromatic compound of 6 to 10 carbon atoms having a hydroxyl group, and a non-aromatic cyclic compound of 5 to 6 carbon atoms having a hydroxyl group.

According to an embodiment of the present disclosure, the sugar compound may be selected from the group consisting of tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, glucose, idose, talose, erythrurose, xylulose, psicose, turanose, cellobiose, amylopectin, glucosamine, mannosamine, fucose, glucuronic acid, glucosan, gluco-lactone, abequose, galactosamine, isomalto-oligosaccharide, xylo-oligosaccharide, gentio-oligosaccharide, sorbose, nigero-oligosaccharide, palatinose oligosaccharide, fructooligosaccharide, maltotetraol, maltotriol, malto-oligosaccharide, lactulose, melibiose, raffinose, rhamnose, and ribose.

According to an embodiment of the present disclosure, the flavoring agent may develop the flavor during pyrolysis.

According to an embodiment of the present disclosure, the flavoring agent may be decomposed into the sugar compound, the flavoring compound, the lactone compound, and carbon dioxide during pyrolysis.

According to an embodiment of the present disclosure, the flavoring agent may be pyrolyzed at a temperature of 80° C. or higher.

According to an embodiment of the present disclosure, the flavoring agent may be a flavoring agent for food or smoking articles.

According to an embodiment of the present disclosure, the present disclosure relates to a composition including the flavoring agent according to the present disclosure.

According to an embodiment of the present disclosure, the composition may be solid, slurry, paste, gel, liquid, emulsion, or aerosol.

According to an embodiment of the present disclosure, the composition may further include an acceptable carrier, an additive, or both for foods or smoking articles.

According to an embodiment of the present disclosure, the present disclosure relates to a smoking article including the flavoring agent according to the present disclosure.

According to an embodiment of the present disclosure, the smoking article may include slurry, paste, liquid, gel, powder, beads, sheet, film, fiber, or molded article including the flavoring agent.

According to an embodiment of the present disclosure, the smoking article may be a cigarette or an electronic cigarette.

According to an embodiment of the present disclosure, the present disclosure relates to a food including the flavoring agent according to the present disclosure.

According to an embodiment of the present disclosure, the food may be mixed with the flavoring agent of the present disclosure or cooked by heat.

Effects

According to embodiments of the present disclosure, the flavoring agent according to the present disclosure may improve an acrid smell of sidestream smoke as the flavoring component is developed during smoking when applied to the smoking article, and improve the tobacco taste and constantly maintain the tobacco taste because the flavoring component is released during pyrolysis by heating.

According to embodiments of the present disclosure, since the flavoring agent according to the present disclosure is pyrolyzed by heating to develop the flavoring component, it is possible to provide rich flavor in a cooking process when applied to foods, and to prolong the storage life of the flavoring agent in the storage process of foods.

BEST MODE FOR CARRYING OUT THE INVENTION

Figure 1:
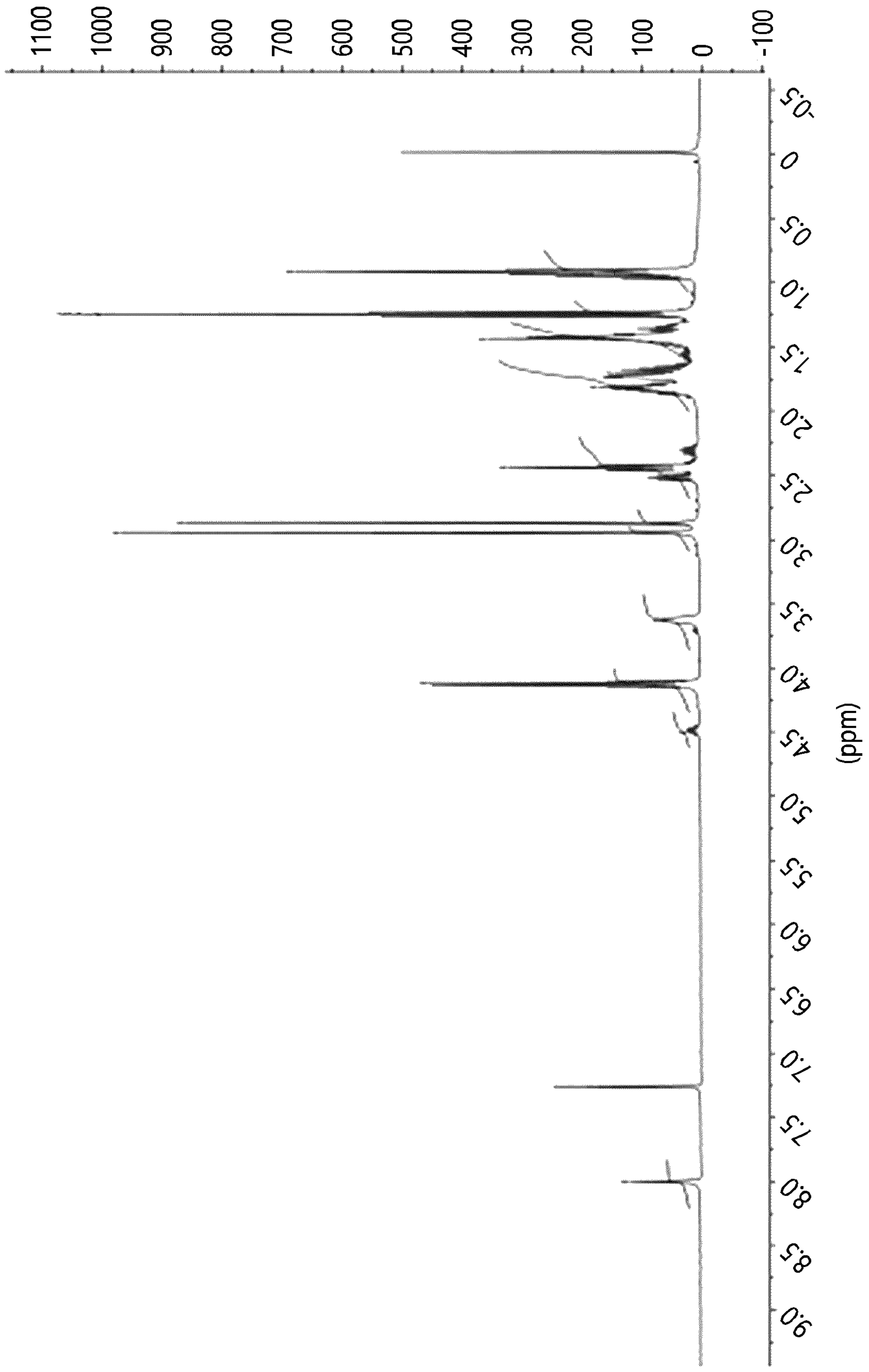
FIG. 1 illustrates results of NMR analysis of ethyl 4-hydroxyheptanoate (2a) prepared in examples, according to an embodiment of the present disclosure.
Figure 2:
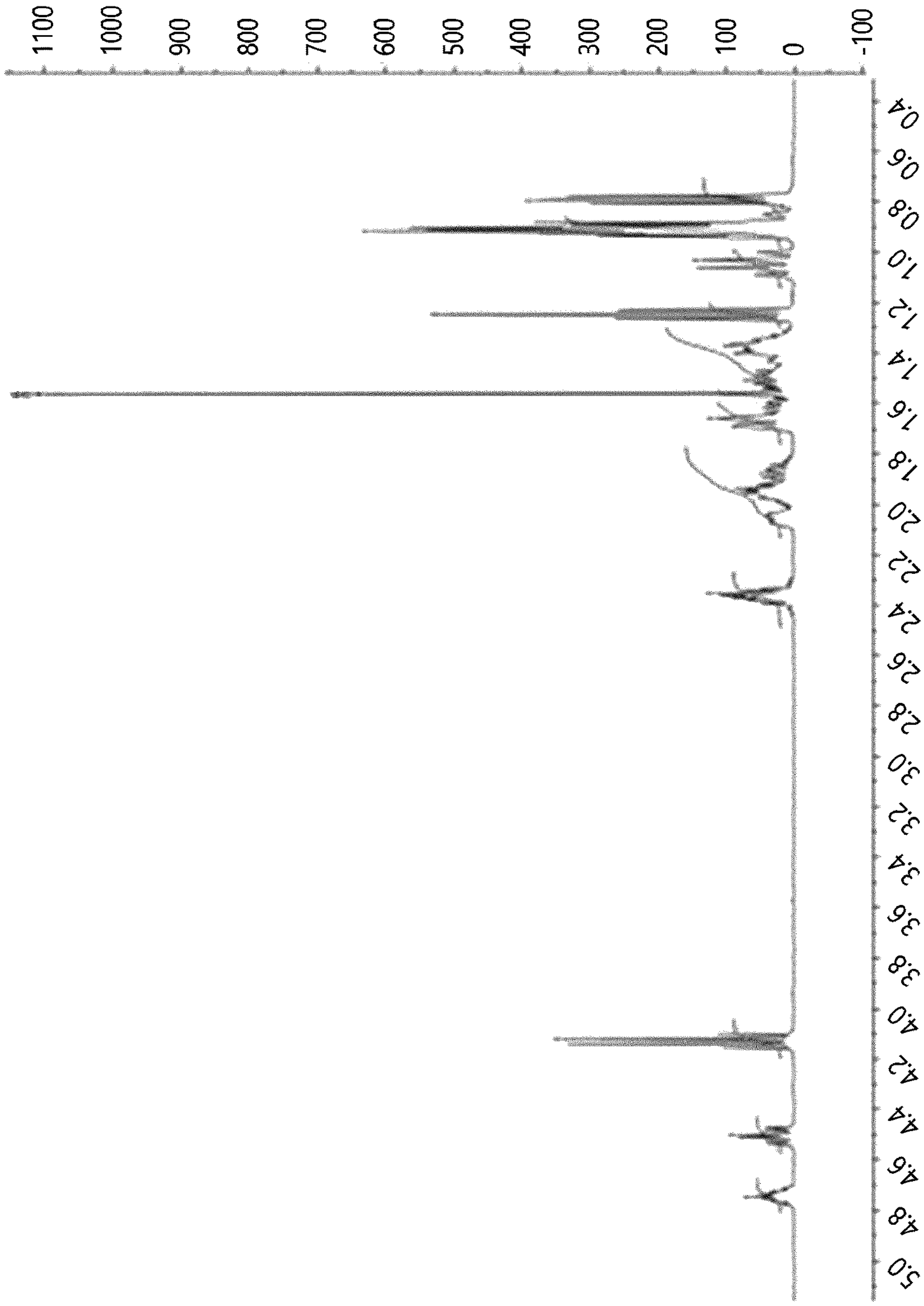
FIG. 2 illustrates results of NMR analysis of ethyl 4-(menthylcarbonyloxy)heptanoate (3a) prepared in examples, according to an embodiment of the present disclosure.
Figure 3:
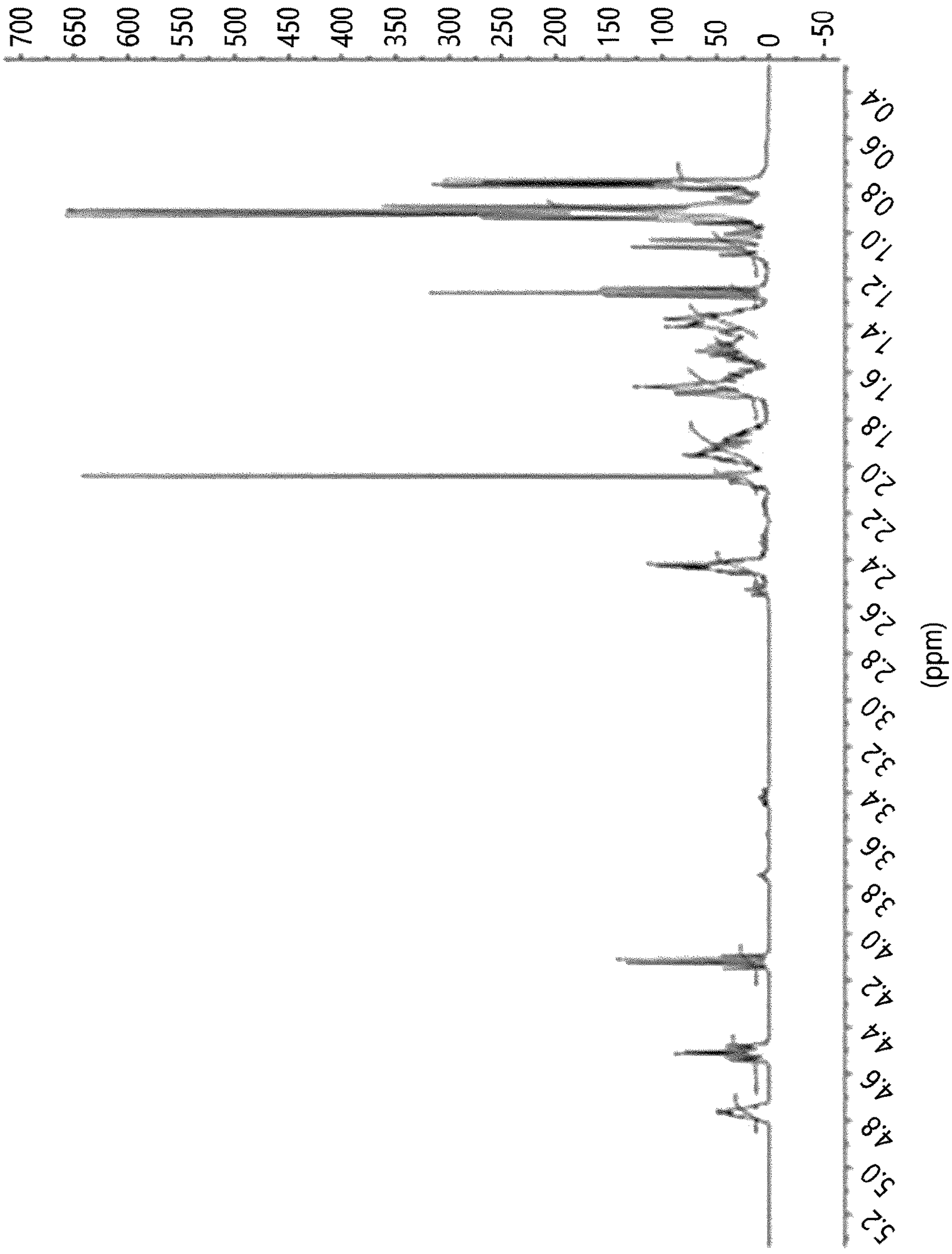
FIG. 3 illustrates results of NMR analysis of 4-(menthylcarbonyloxy)heptanoic acid (4a).
Figure 4:
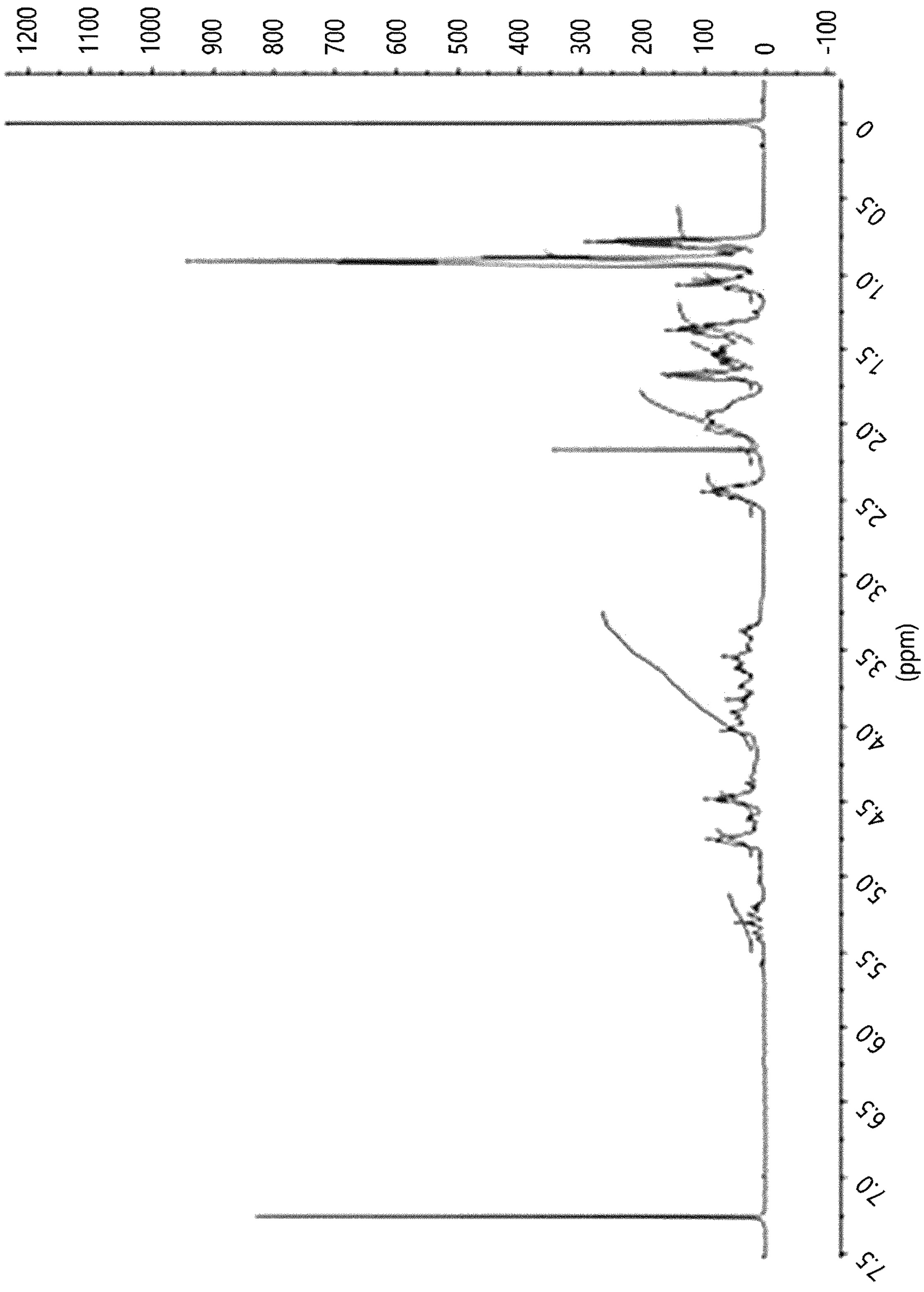
FIG. 4 illustrates results of NMR analysis of glucosyl-(4-menthylcarbonyloxy)heptanoate (5a) prepared in examples, according to an embodiment of the present disclosure.
Figure 5:
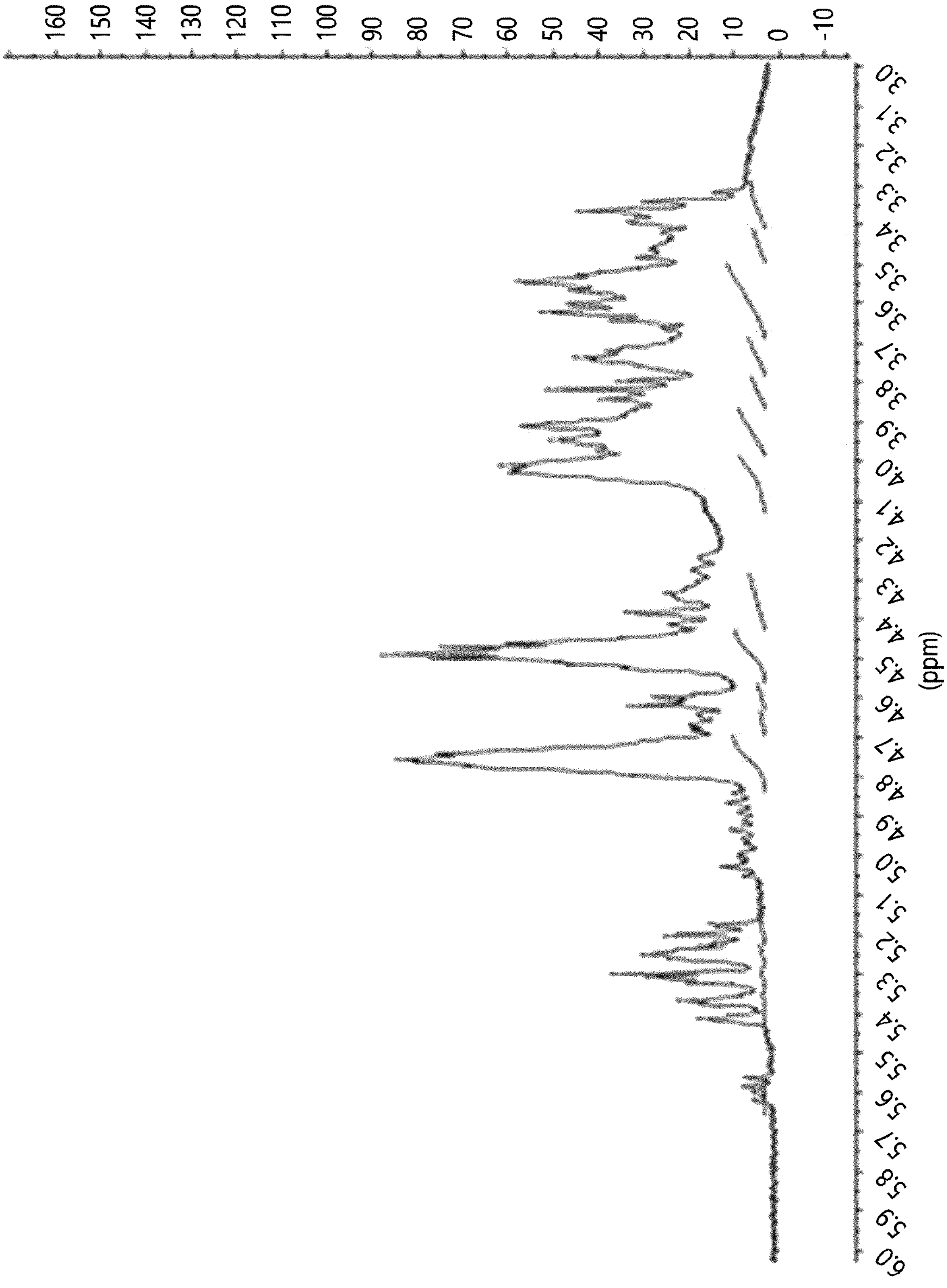
FIG. 5 illustrates results of NMR analysis of glucosyl-(4-menthylcarbonyloxy)heptanoate (5a) prepared in examples, according to an embodiment of the present disclosure.
Figure 6:
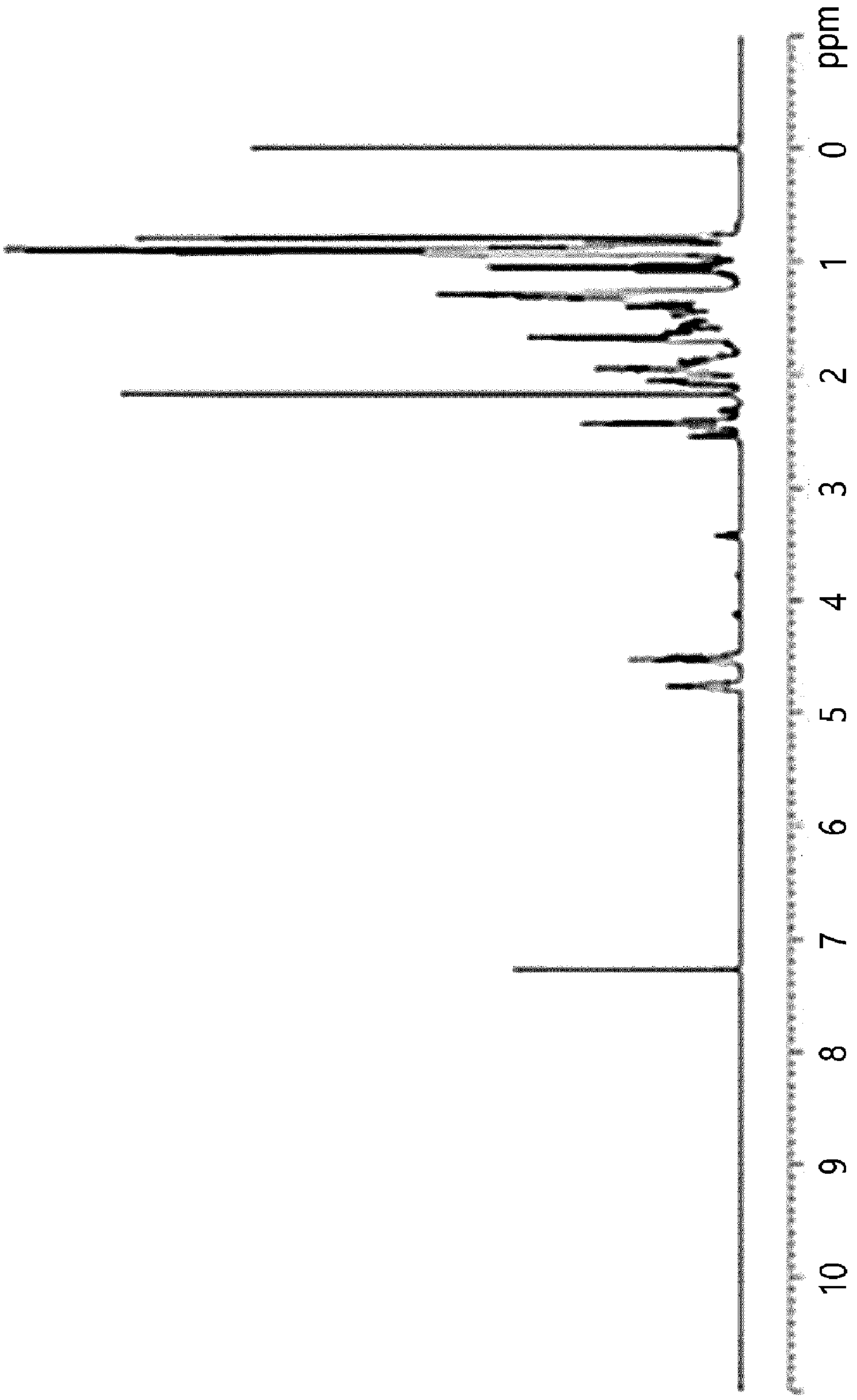
FIG. 6 illustrates results of NMR analysis of 4-(menthylcarbonyloxy)nonanoic acid (4b) prepared in examples, according to an embodiment of the present disclosure.
Figure 7:
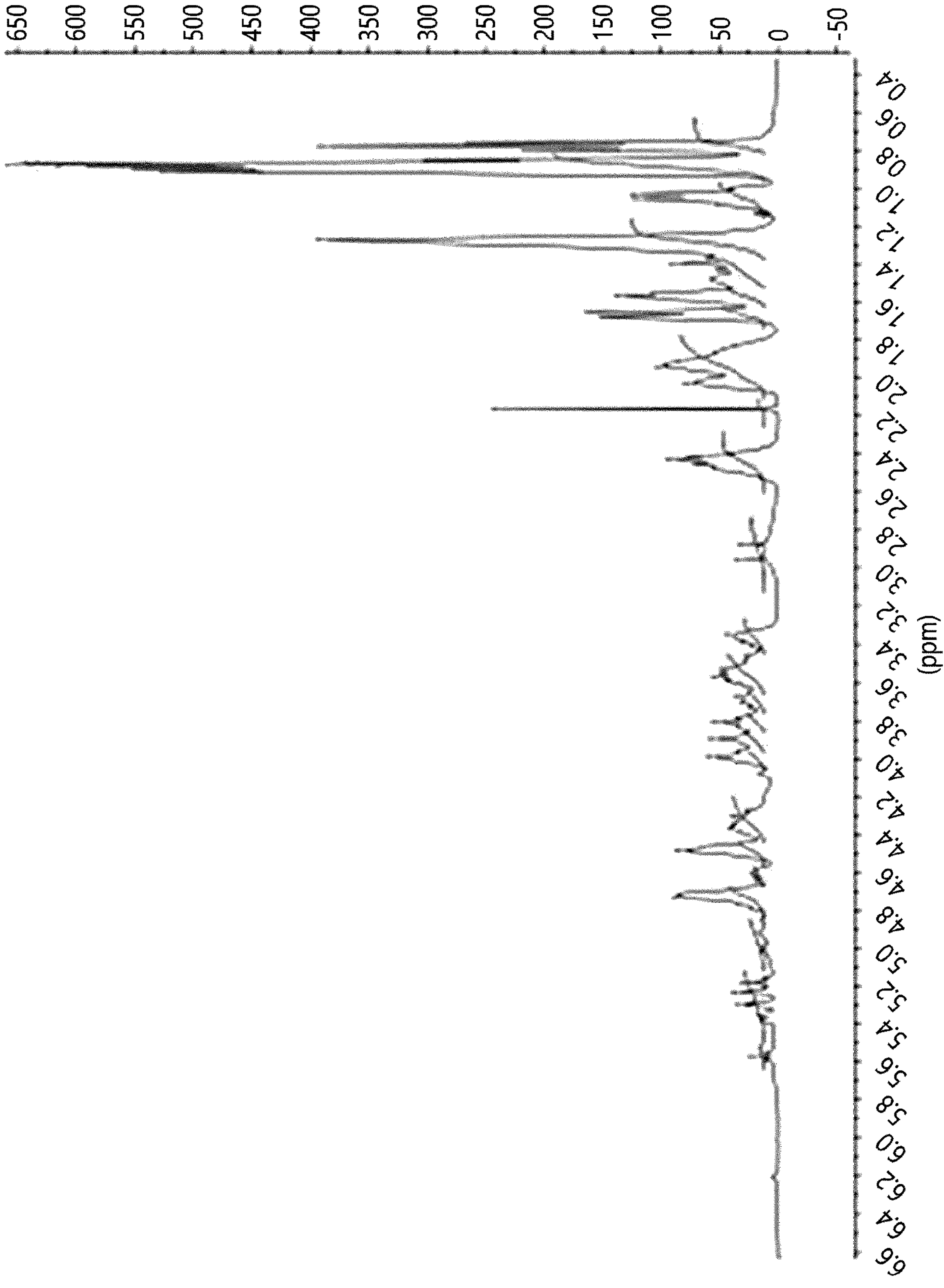
FIG. 7 illustrates results of NMR analysis of glucosyl-(4-menthylcarbonyloxy)nonanoate (5b) prepared in examples, according to an embodiment of the present disclosure.
Figure 8:
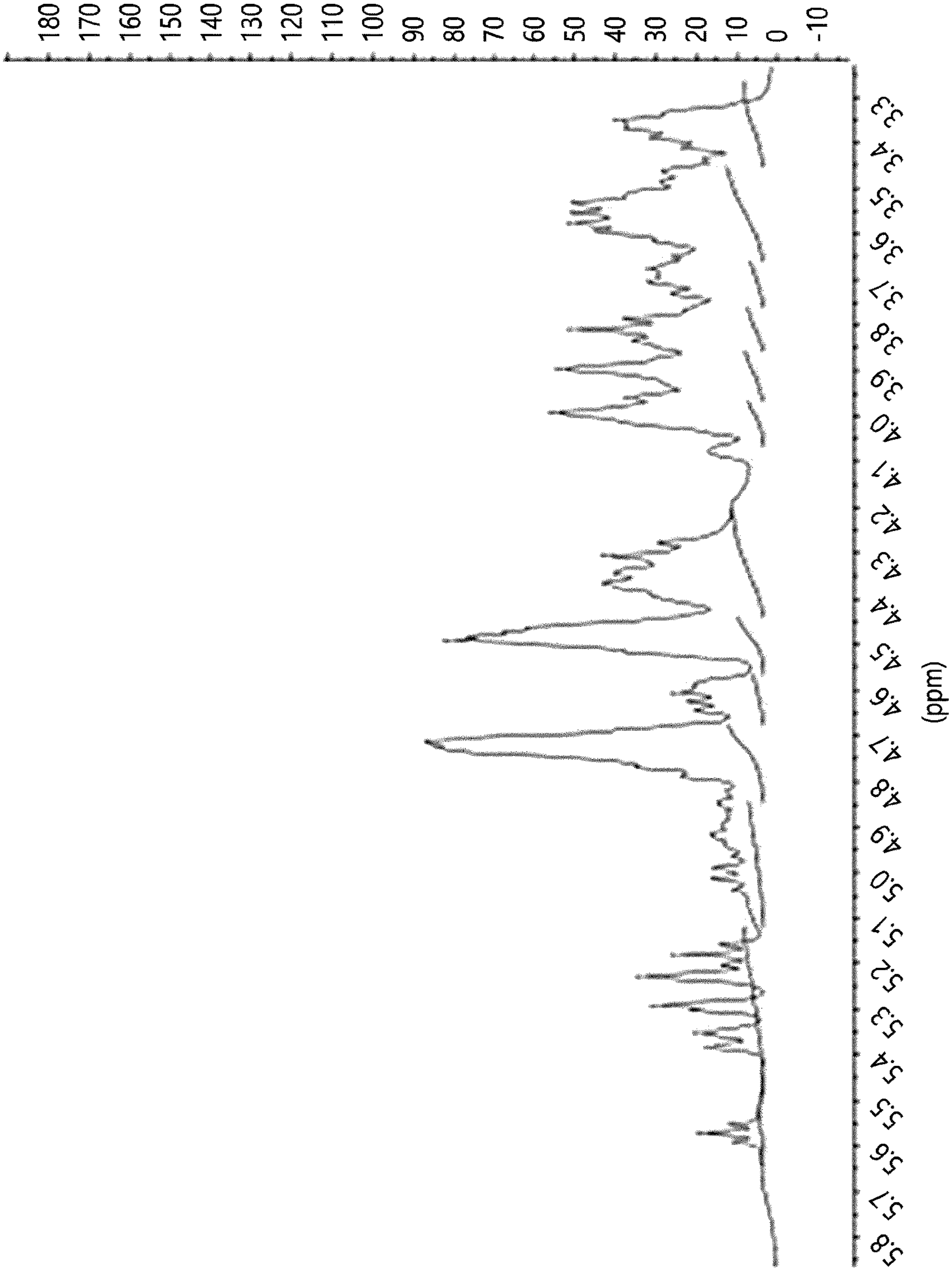
FIG. 8 illustrates results of NMR analysis of glucosyl-(4-menthylcarbonyloxy)nonanoate (5b) prepared in examples, according to an embodiment of the present disclosure.
Figure 9:
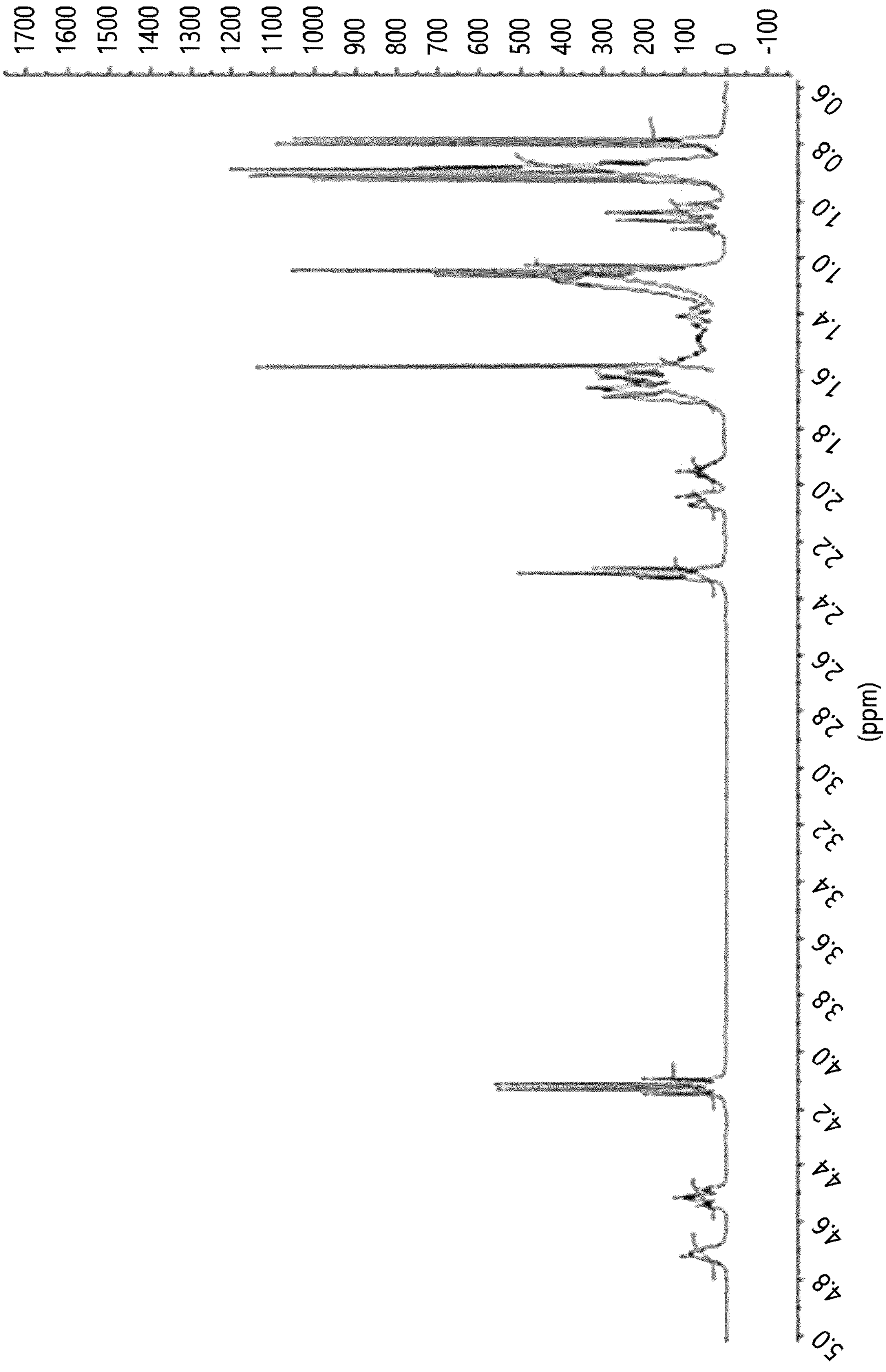
FIG. 9 illustrates results of NMR analysis of ethyl 5-(menthylcarbonyloxy)decanoate (3c) prepared in examples, according to an embodiment of the present disclosure.
Figure 10:
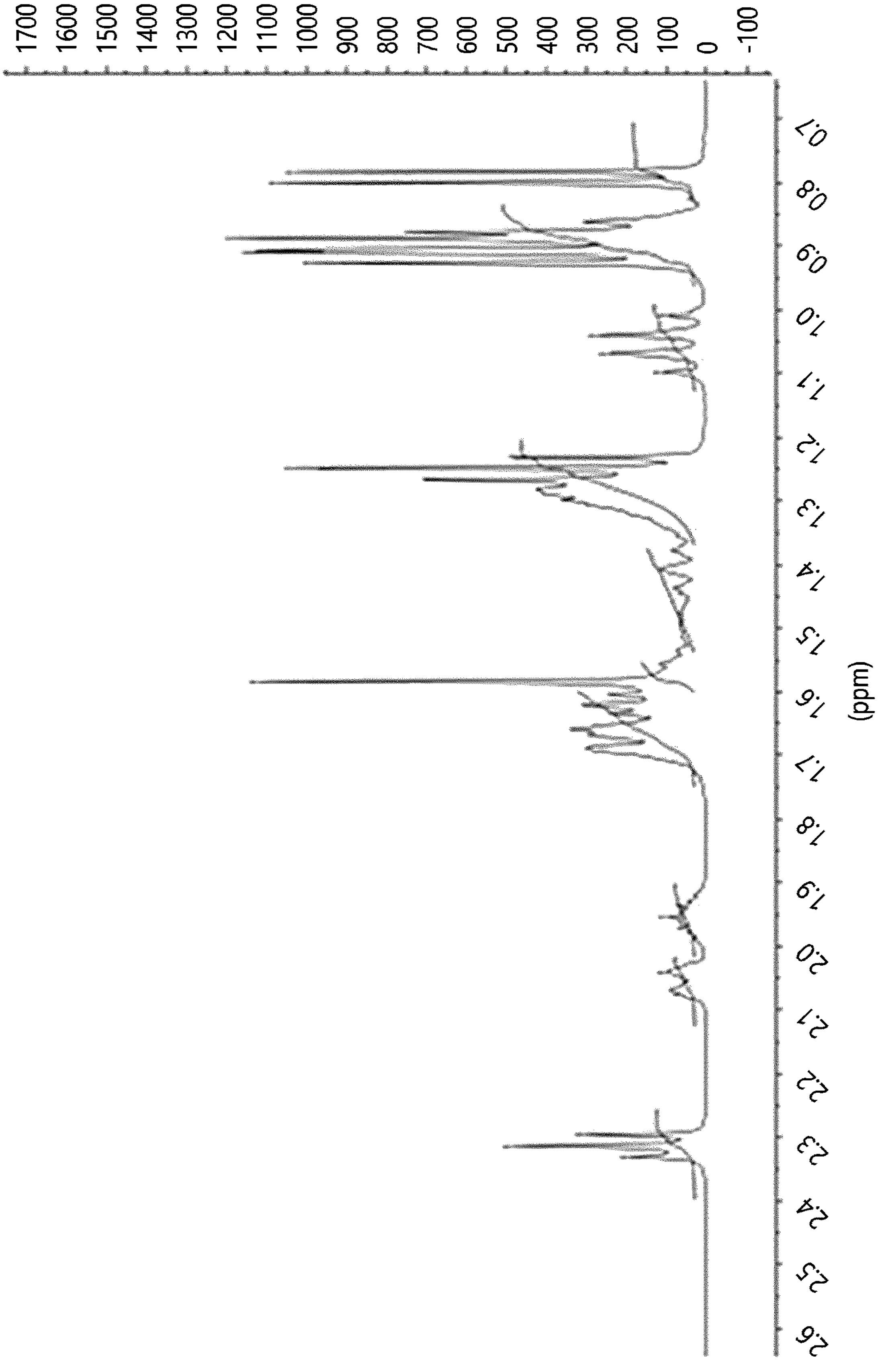
FIG. 10 illustrates results of NMR analysis of ethyl 5-(menthylcarbonyloxy)decanoate (3c) prepared in examples, according to an embodiment of the present disclosure.
Figure 11:
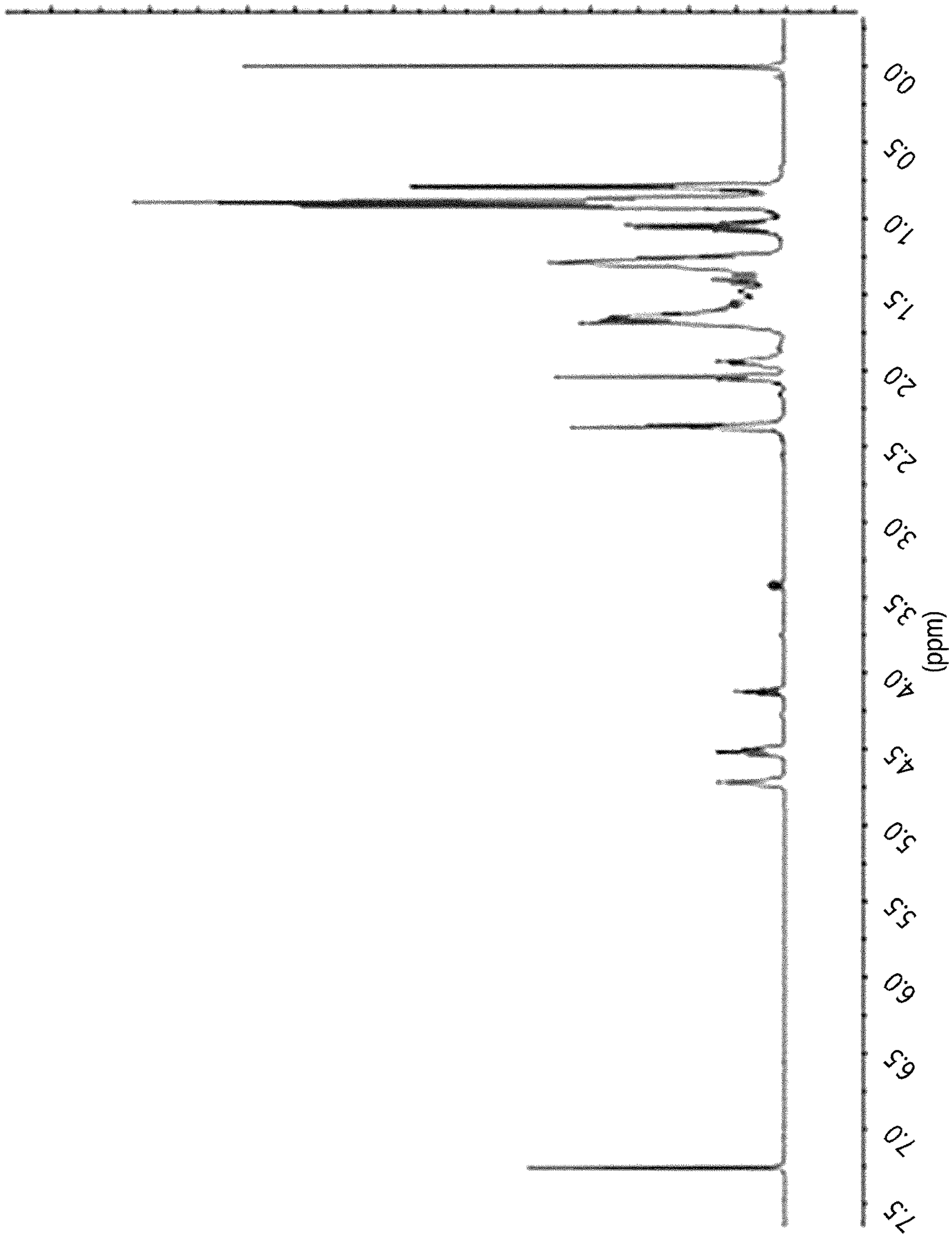
FIG. 11 illustrates results of NMR analysis of 5-(menthylcarbonyloxy)decanoic acid (4c) prepared in examples, according to an embodiment of the present disclosure.
Figure 12:
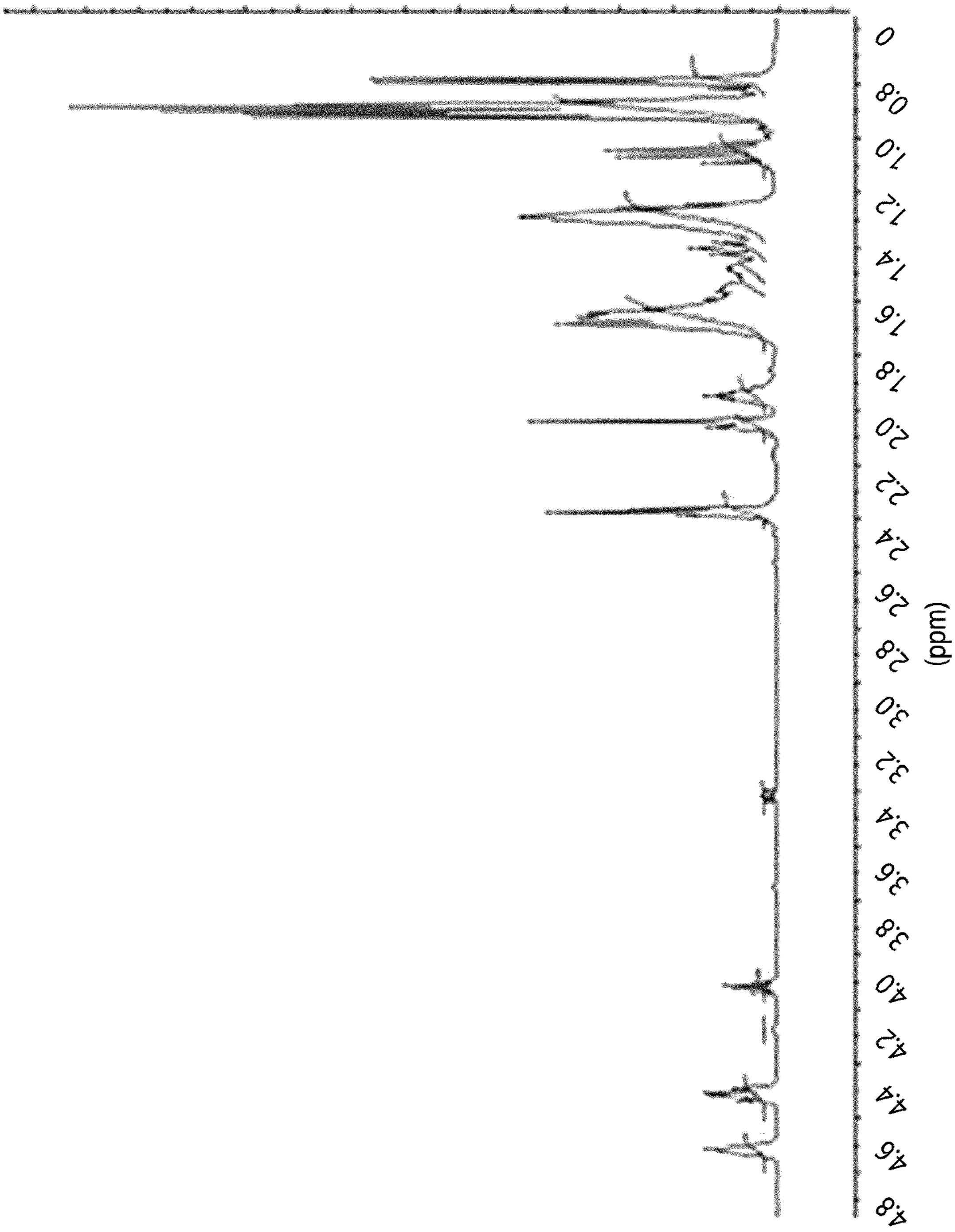
FIG. 12 illustrates results of NMR analysis of 5-(menthylcarbonyloxy)decanoic acid (4c) prepared in examples, according to an embodiment of the present disclosure.
Figure 13:
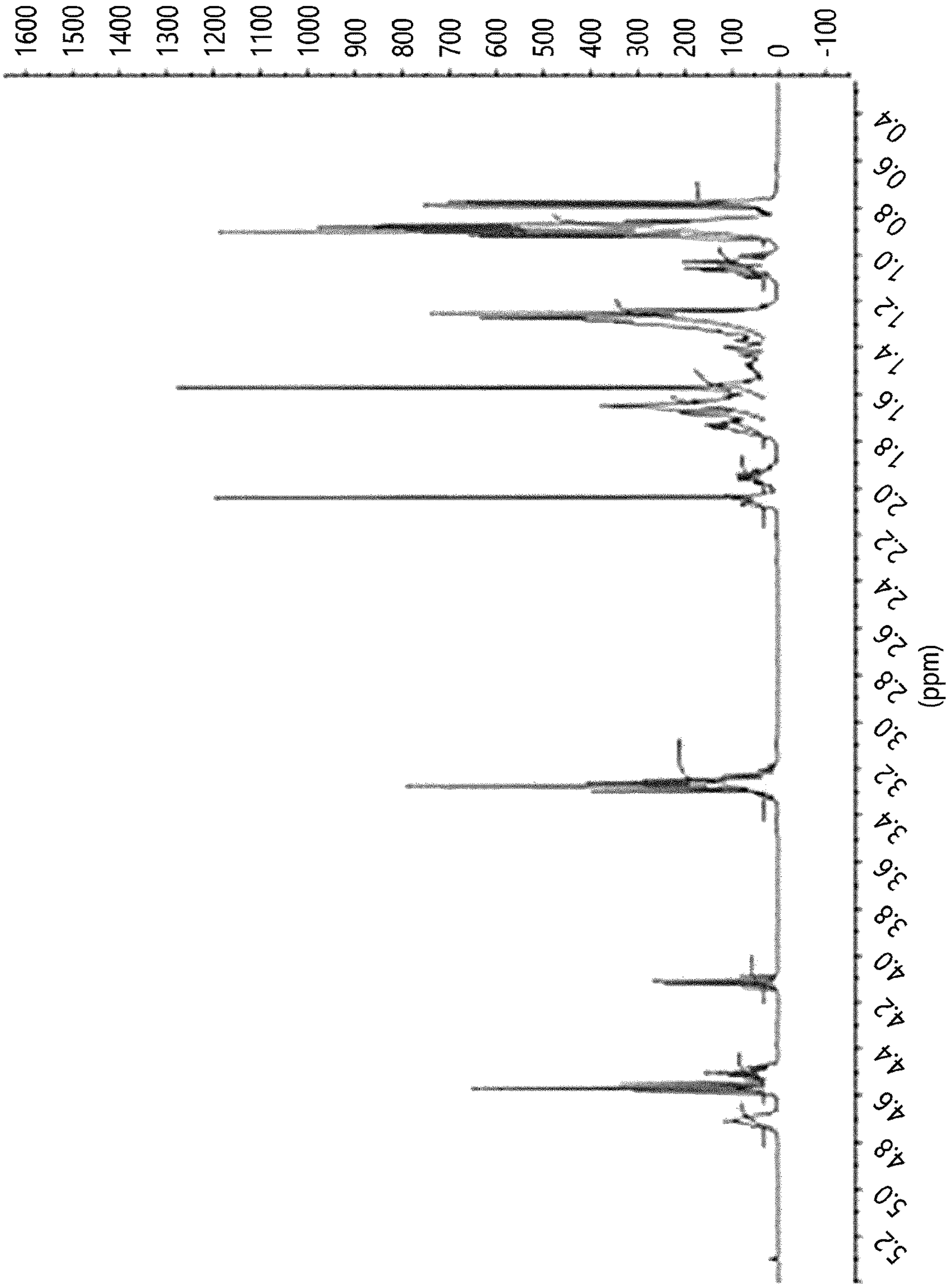
FIG. 13 illustrates results of NMR analysis of 5-isopropyl-2-menthylcyclohexyl-(1-oxo-1-(2-thioxothiazolidin-3-yl)decan-5-yl)carbonate (5c) prepared in examples, according to an embodiment of the present disclosure.
Figure 14:
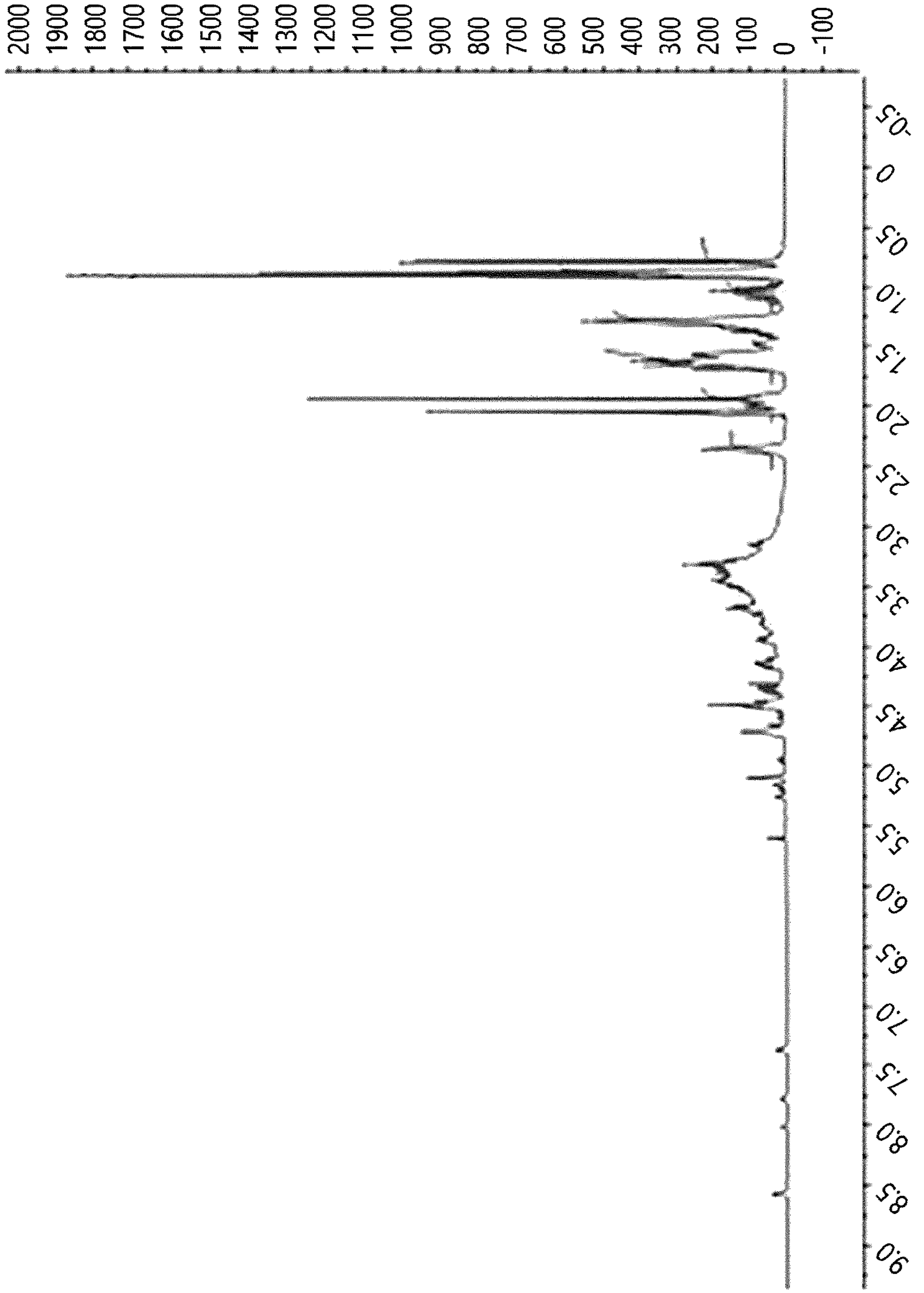
FIG. 14 illustrates results of NMR analysis of glucosyl-(5-menthylcarbonyloxy)decanoate (6c) prepared in examples, according to an embodiment of the present disclosure.
Figure 15:
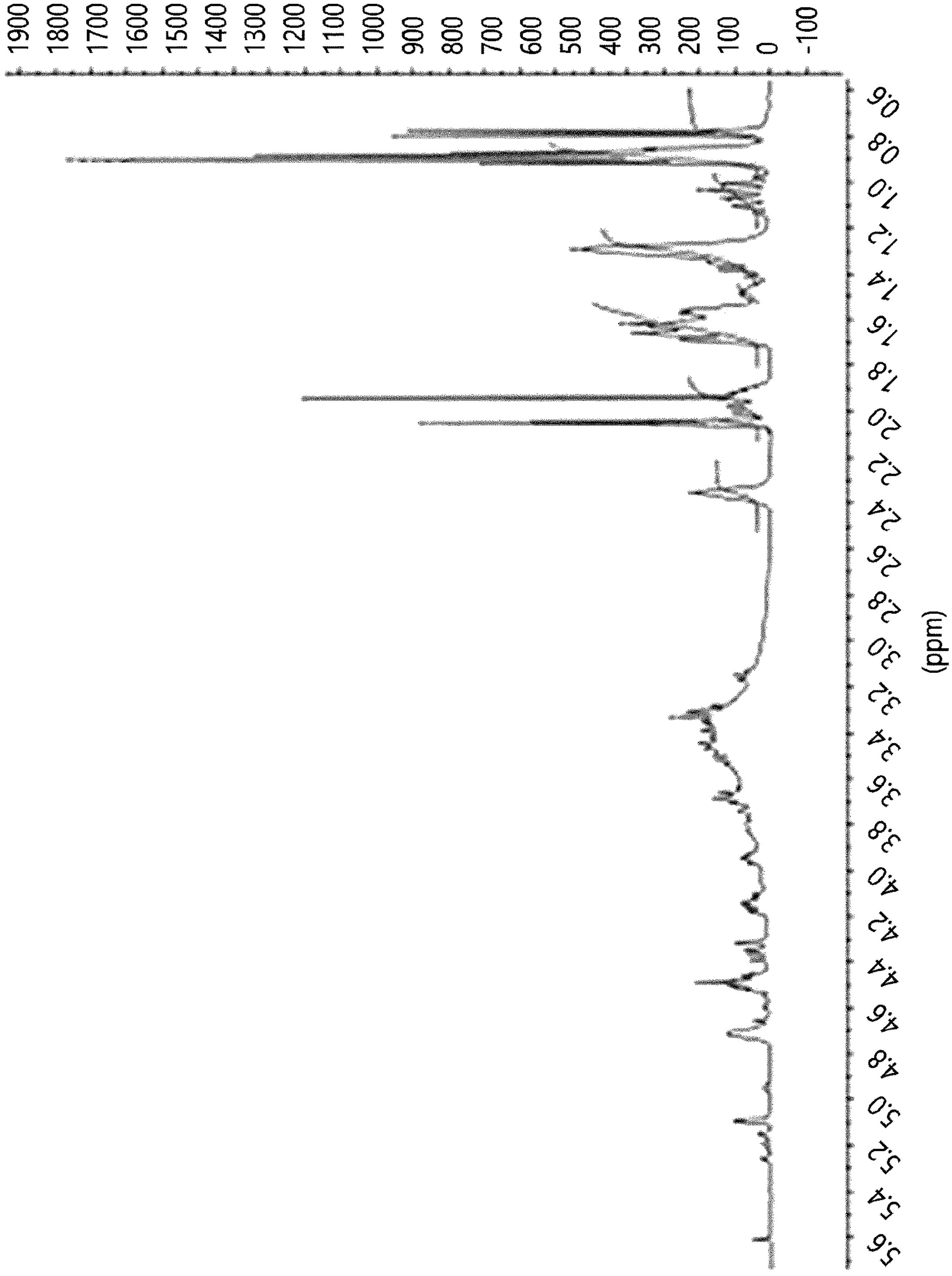
FIG. 15 illustrates results of NMR analysis of glucosyl-(5-menthylcarbonyloxy)decanoate (6c) prepared in examples, according to an embodiment of the present disclosure.
Figure 16:
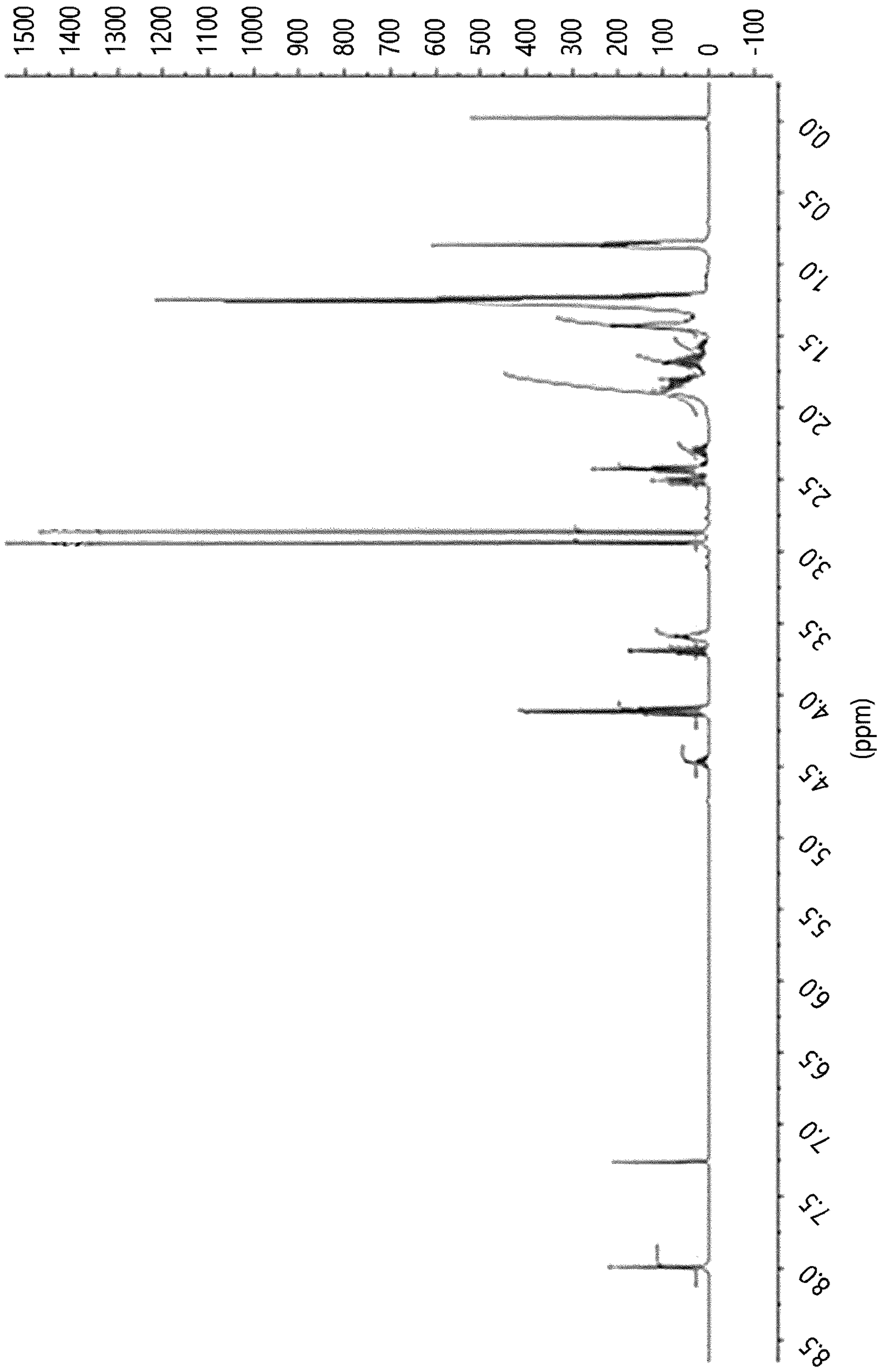
FIG. 16 illustrates results of NMR analysis of ethyl 4-hydroxyundecanoate (2d) prepared in examples, according to an embodiment of the present disclosure.
Figure 17:
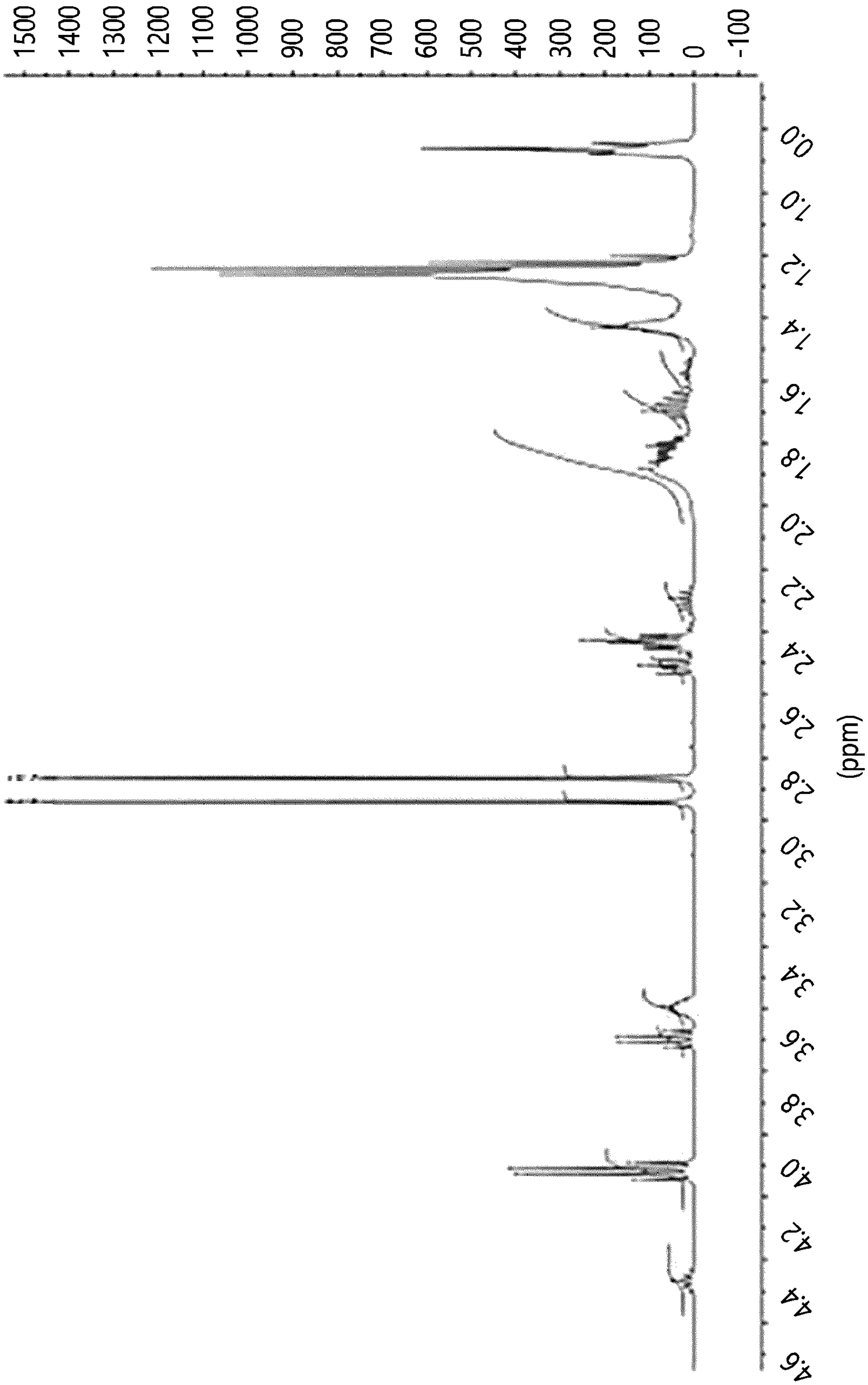
FIG. 17 illustrates results of NMR analysis of ethyl 4-hydroxyundecanoate (2d) prepared in examples, according to an embodiment of the present disclosure.
Figure 18:
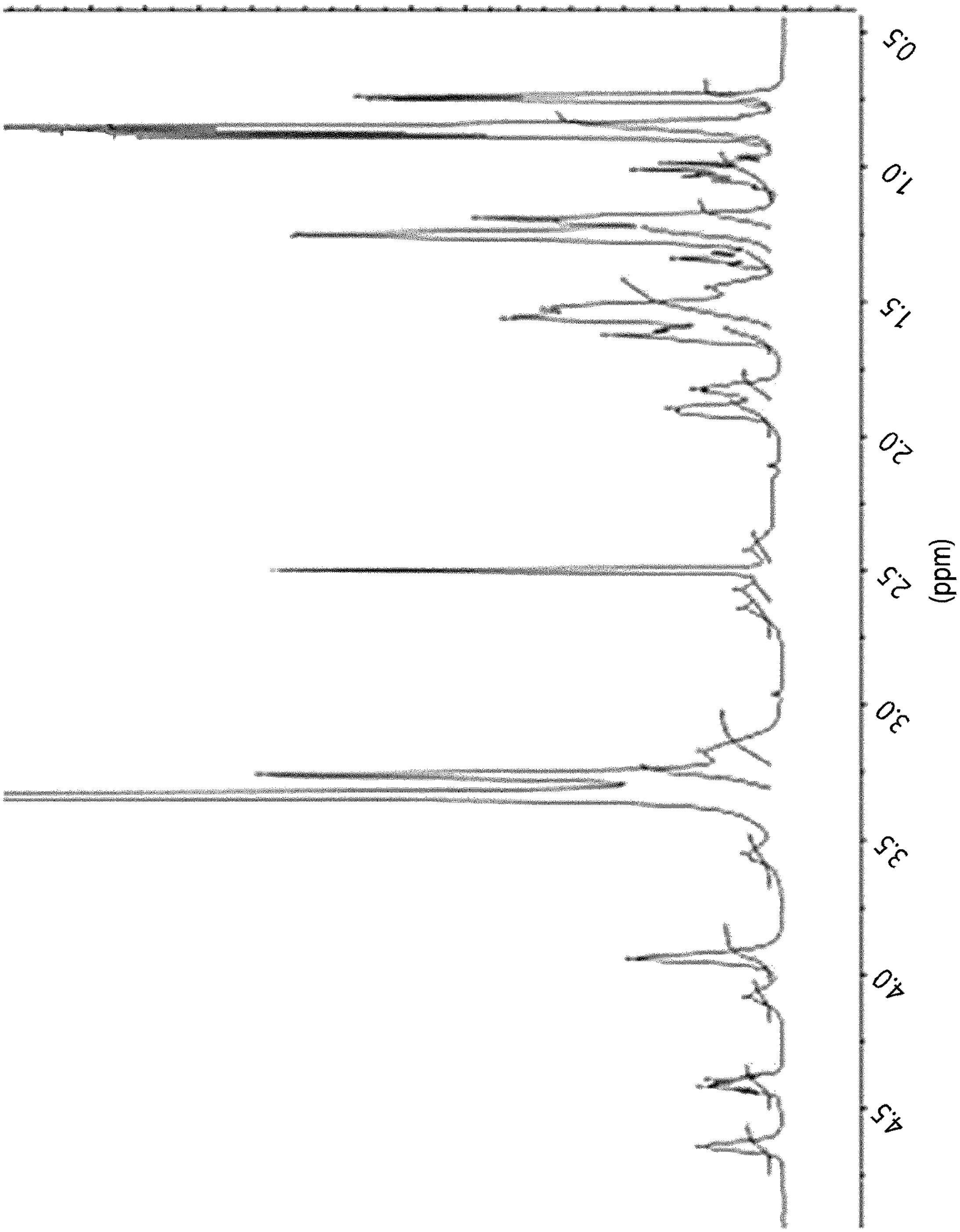
FIG. 18 illustrates results of NMR analysis of ethyl 4-(menthylcarbonyloxy)undecanoate (3d) prepared in examples, according to an embodiment of the present disclosure.
Figure 19:
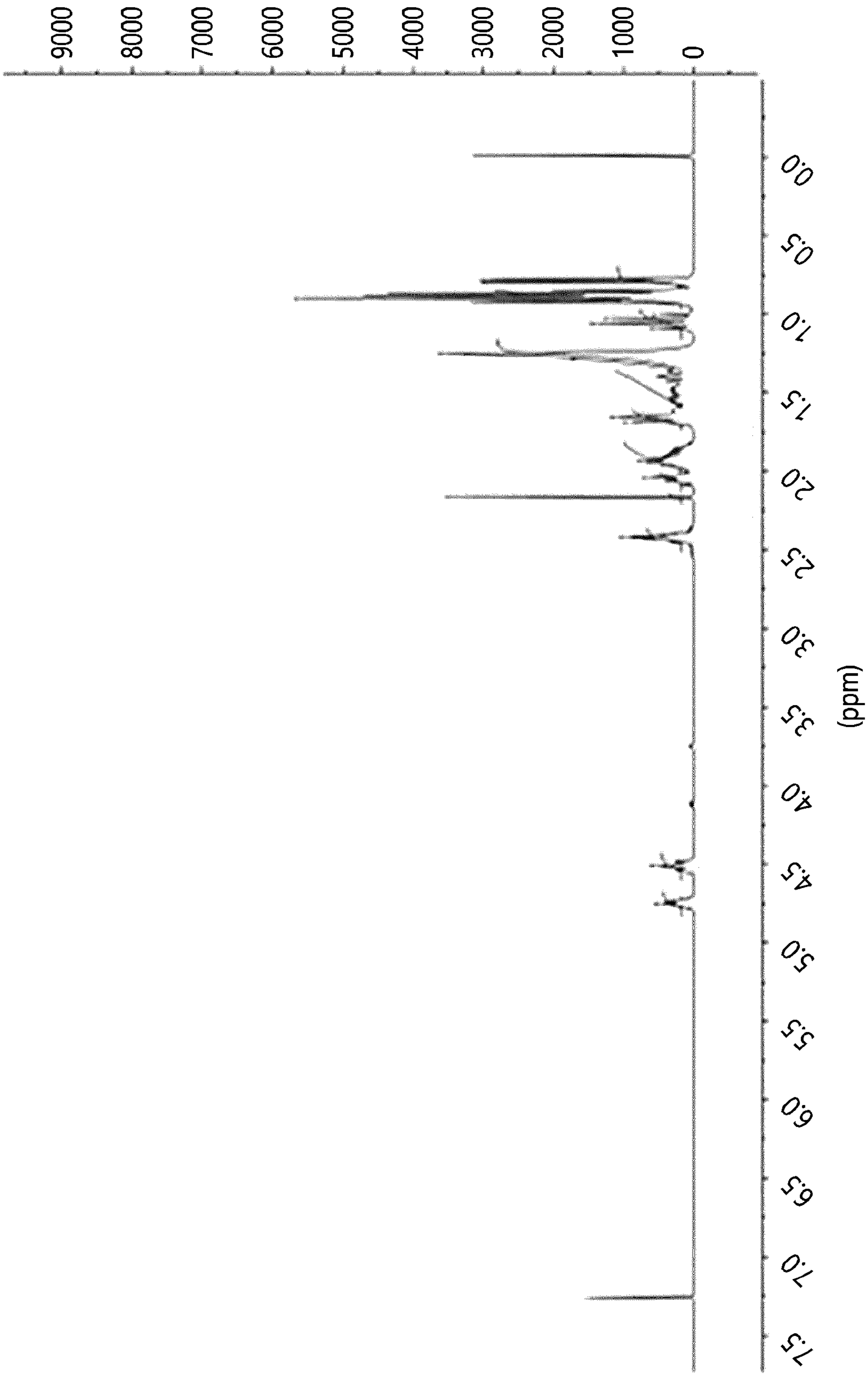
FIG. 19 illustrates results of NMR analysis of 4-(menthylcarbonyloxy)undecanoic acid (4d) prepared in examples, according to an embodiment of the present disclosure.
Figure 20:
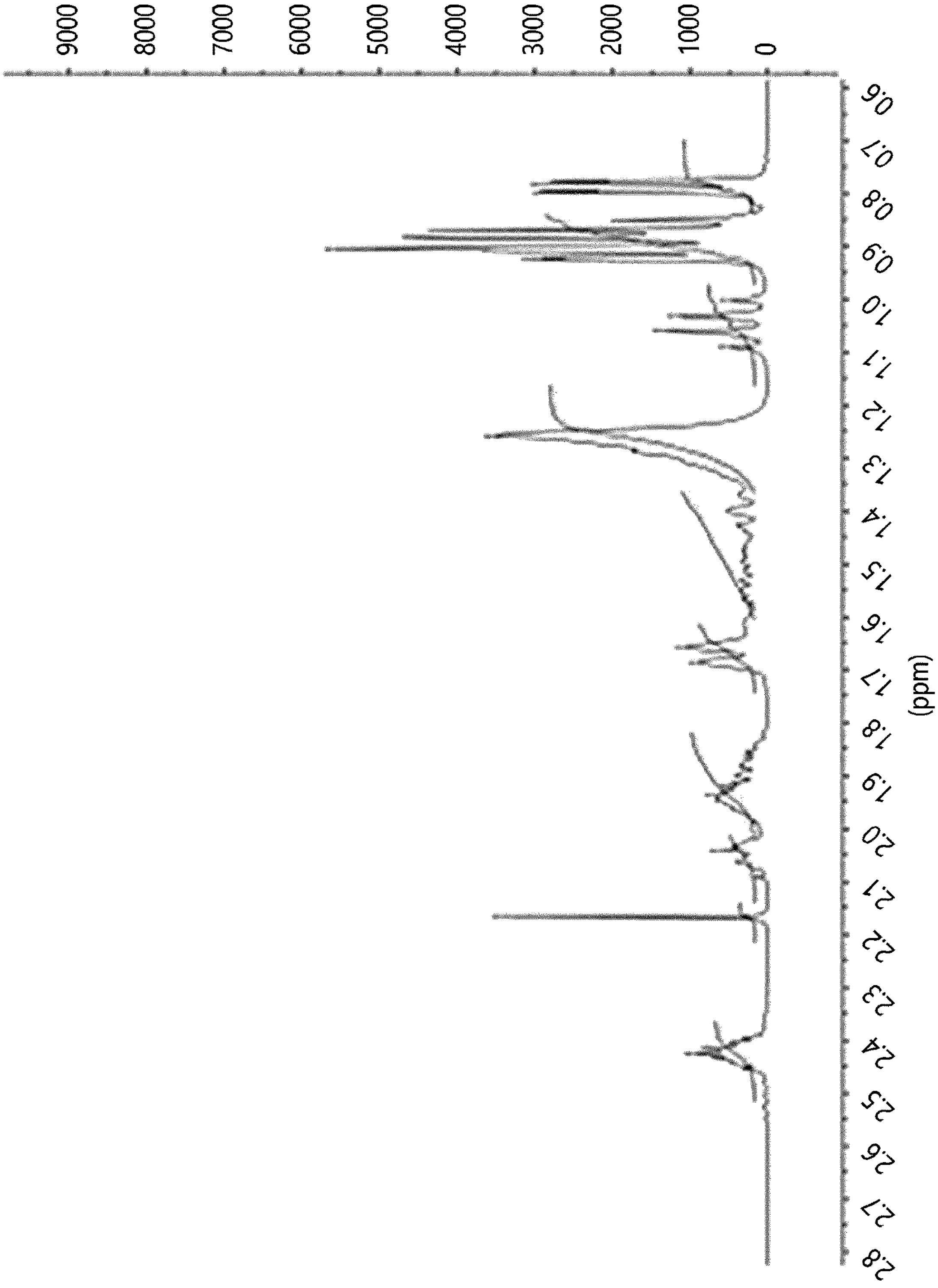
FIG. 20 illustrates results of NMR analysis of 4-(menthylcarbonyloxy)undecanoic acid (4d) prepared in examples, according to an embodiment of the present disclosure.
Figure 21:
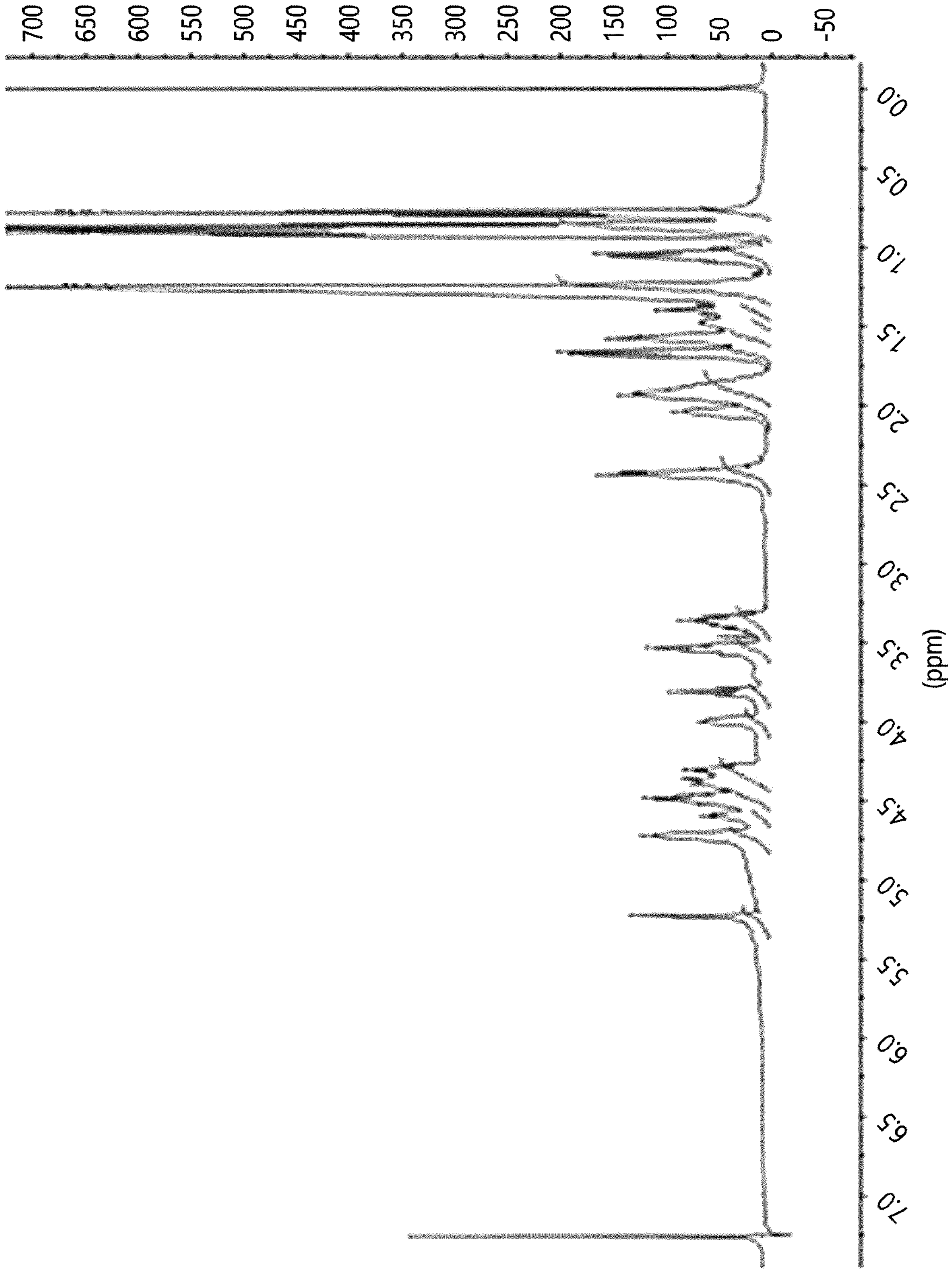
FIG. 21 illustrates results of NMR analysis of glucosyl-(4-menthylcarbonyloxy)undecanoate (6d) prepared in examples, according to an embodiment of the present disclosure.
Figure 22:
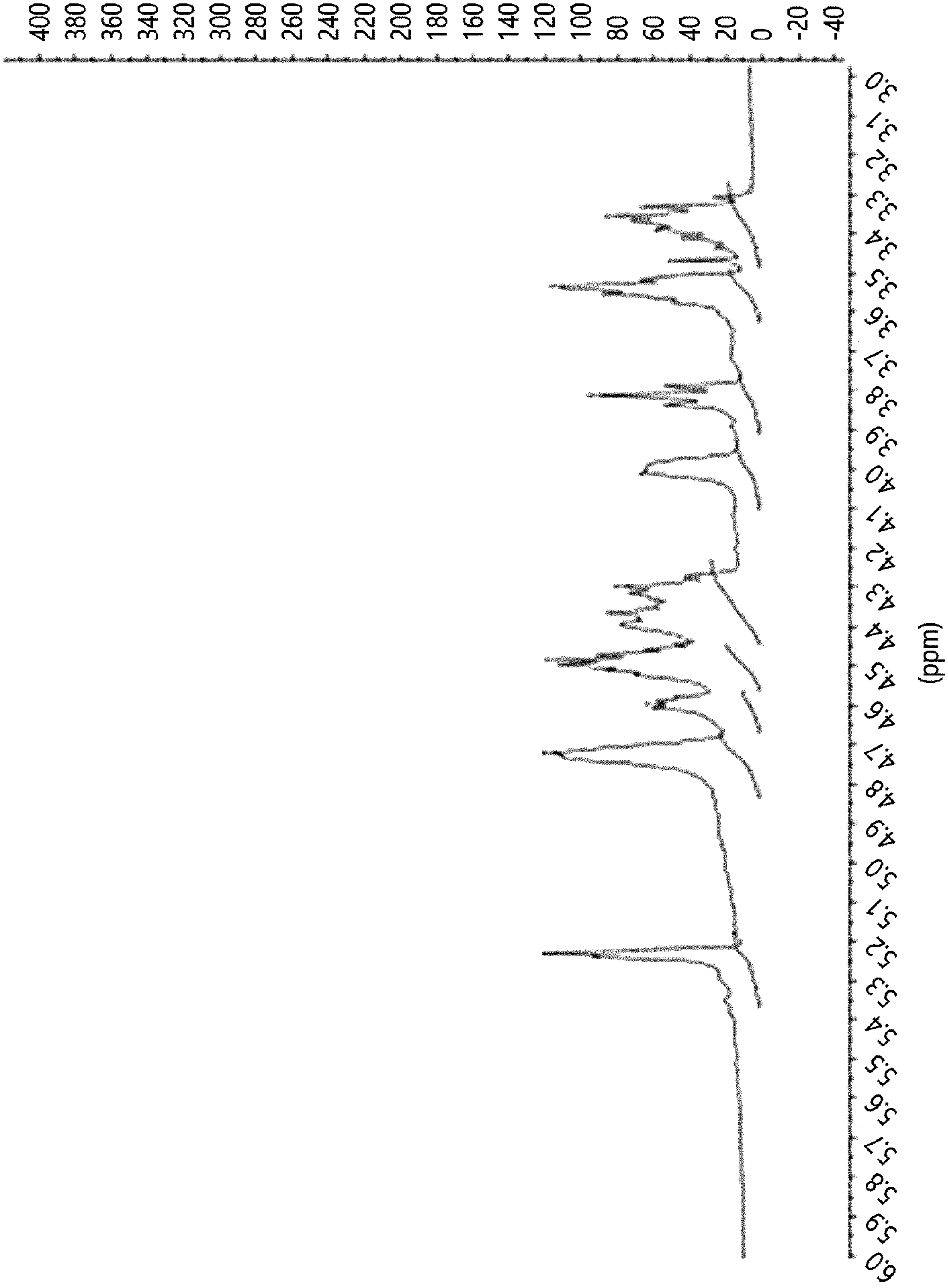
FIG. 22 illustrates results of NMR analysis of glucosyl-(4-menthylcarbonyloxy)undecanoate (6d) prepared in examples, according to an embodiment of the present disclosure.
Figure 23:
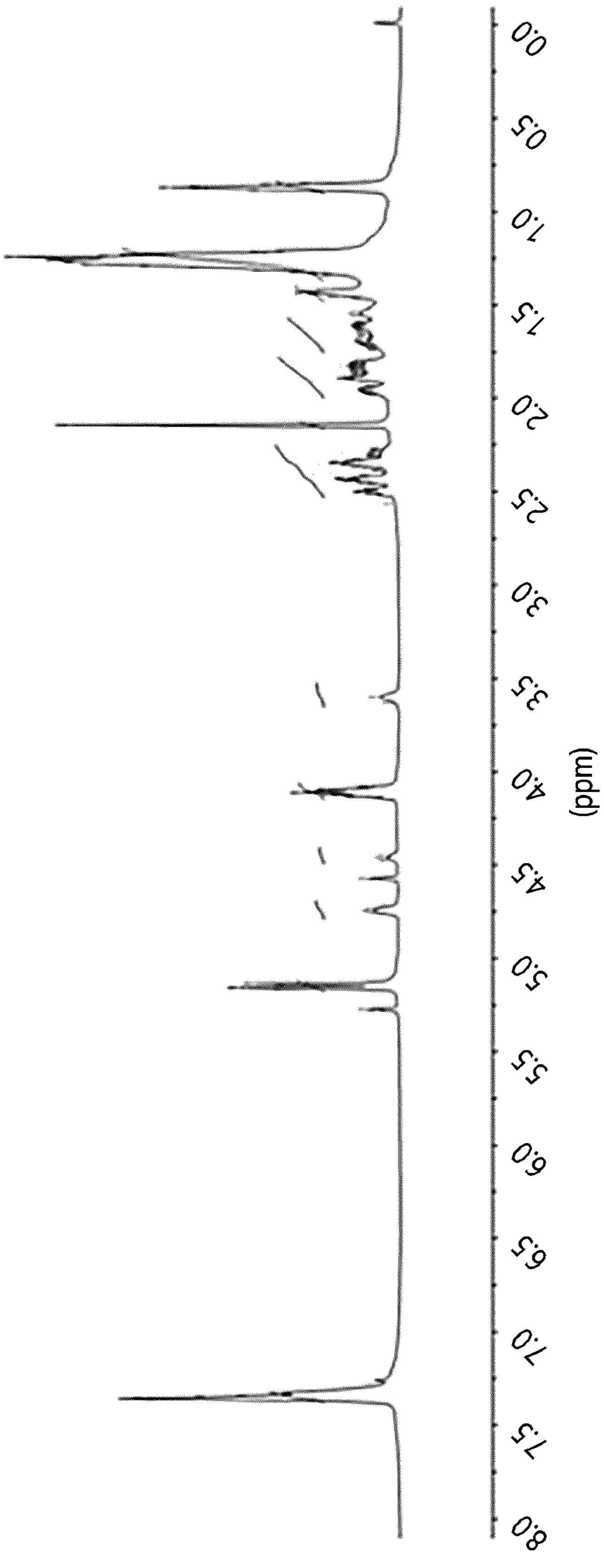
FIG. 23 illustrates results of NMR analysis of ethyl 4-(benzyloxycarbonyloxy)undecanoate (3e) prepared in examples, according to an embodiment of the present disclosure.

However, hereinafter, embodiments of the present disclosure will be described in detail with reference to the accompanying drawings. In describing the embodiment of the present disclosure, a detailed description of known functions or constitutions will be omitted if it is determined that they unnecessarily make the gist of the present disclosure unclear. Terminologies used herein are terminologies used to properly express embodiments of the present disclosure, which may vary according to a user, an operator's intention, or customs in the art to which the present disclosure pertains. Terminologies used herein are terminologies used to properly express preferred embodiments of the present disclosure, which may vary according to a user, an operator's intention, or customs in the art to which the present disclosure pertains. Therefore, definitions of these terminologies will have to be made based on the content throughout this specification. Like reference numerals presented in each drawing indicate like elements.

Throughout this specification, it will be understood that when a member is referred to as being "on" another member, it can be directly on the other member or intervening members may also be present.

Throughout the specification, when a certain part "comprises" a certain component, it will be understood to imply the inclusion of stated elements but not the exclusion of any other elements.

Hereinafter, a novel flavoring agent of the present disclosure and a use of the flavoring agent will be described in detail with reference to embodiments and drawings. However, the present disclosure is not limited to these embodiments and drawings.

The present disclosure relates to a novel flavoring agent, and according to an embodiment of the present disclosure, the flavoring agent may develop flavoring components by pyrolysis when heat is applied.

According to an embodiment of the present disclosure, the flavoring agent may be a compound represented by Formula 1 below.

[Formula 1]

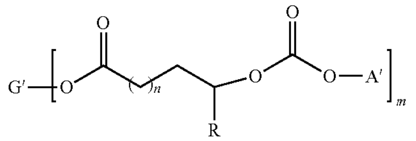

As an example of the present disclosure, Formula 1 includes a sugar compound-derived moiety G' and a flavoring compound-derived moiety A', in Formula 1, the flavoring compound is covalently bound to a carbonate linkage, and the sugar compound may be bound to an ester linkage

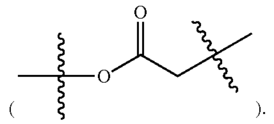 [SMILES: *CC(=O)O*]

When heat is applied, the compound of Formula 1 is pyrolyzed to be decomposed and released into flavoring components of the sugar compound, the flavoring compound and a lactone compound. For example, the compound of Formula 1 may be synthesized by reacting with a hydroxyl group (—OH) of the sugar compound to be linked to an ester linkage, and reacting with a hydroxyl group of the flavoring compound to be linked to a carbonate linkage

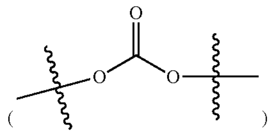 [SMILES: *OC(=O)O*]

as a ring opening mechanism of the lactone compound. That is, the compound Formula 1 has structural stability at approximately room temperature or a temperature close thereto and low volatility, and is decomposed into the sugar compound G, the lactone compound, and the flavoring compound A because the carbonate linkage and the ester linkage are broken by a ring closing mechanism when the heat is applied, so that the flavor is released and carbon dioxide harmless to the human body may be generated during the decomposition process. Since the carbonate linkage is broken by heat, the compound of Formula 1 is decomposed into the flavoring compound to generate carbon dioxide, and then since the ester linkage is broken by closing the ring, the compound of Formula 1 is decomposed into the sugar compound and the lactone compound to develop the flavor.

According to an embodiment of the present disclosure, the moiety A' in Formula 1 may be a moiety derived from a flavoring compound having at least one of an aromatic ring having a hydroxyl group, an aliphatic ring having a hydroxyl group, and an aliphatic chain having a hydroxyl group. The hydroxyl group includes a ring, a chain, or at least one (e.g., one or two) of both, and may correspond to a substituent, a basic backbone, and/or a moiety having a hydroxyl group. The hydroxyl group participates in a covalent bond of the carbonate linkage in Formula 1, and the moiety A' may correspond to a flavoring compound excluding the hydroxyl group. That is, since the hydroxyl group of the flavoring compound in the moiety A' is protected with the carbonate linkage, a decomposition reaction due to ring-closing at room temperature may be prevented.

According to an embodiment of the present disclosure, the flavoring compound may be selected from the group consisting of a cyclic monoterpene-based compound having a hydroxyl group, an acyclic monoterpene-based compound having a hydroxyl group, an aromatic compound of 6 to 10 carbon atoms having a hydroxyl group, and non-aromatic rings of 5 to 10 carbon atoms; or 5 to 6 carbon atoms having a hydroxyl group and isomers thereof. For example, the flavoring compound may be a compound which is selected from the following compounds, and produced when the carbonate linkage of Formula 1 is broken during pyrolysis.

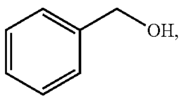 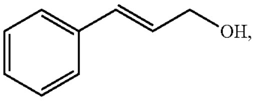

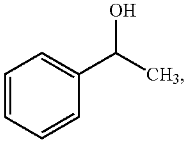 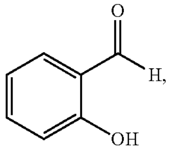

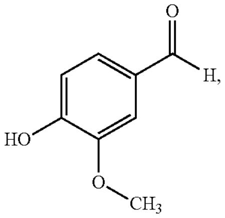 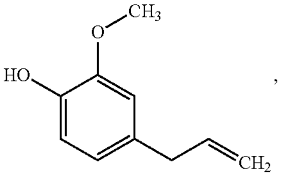,

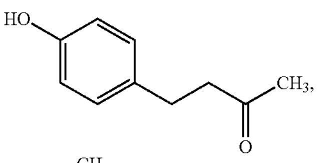 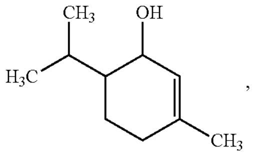,

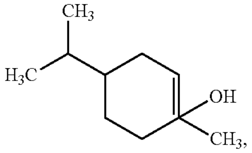 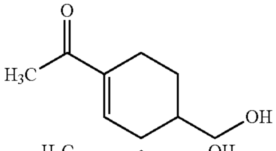,

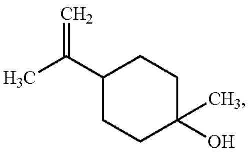 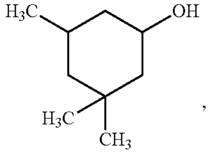,

-continued

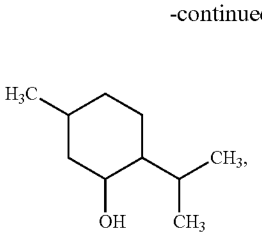 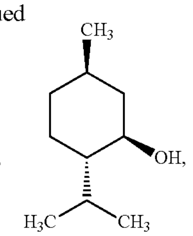

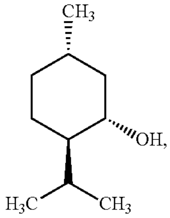 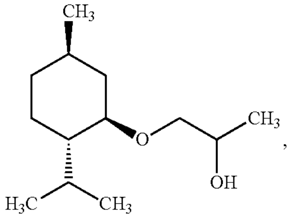,

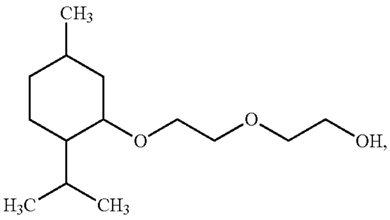

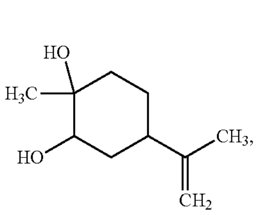 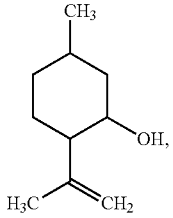

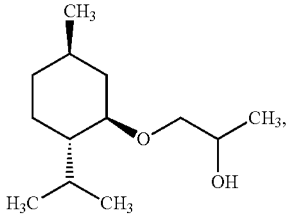

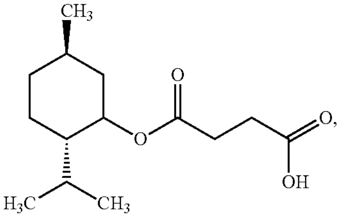

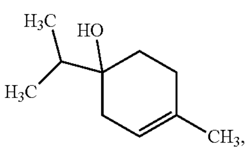 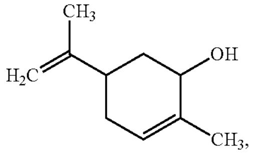

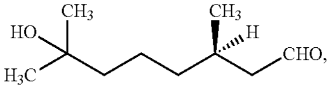

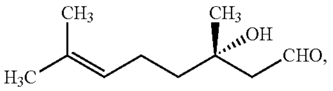

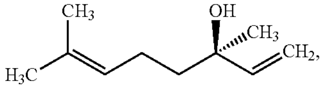 and

-continued

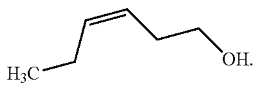

According to an embodiment of the present disclosure, the moiety A' may be selected from the following Formulas. Here, * corresponds to an oxygen site in the carbonate linkage.

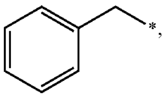
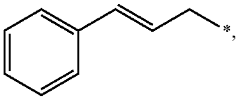

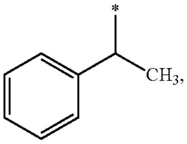
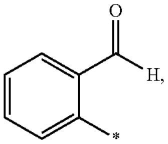

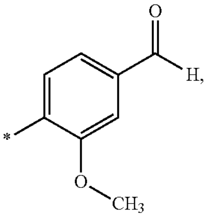
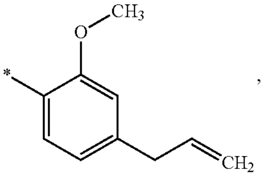
,

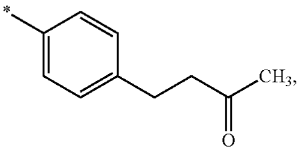
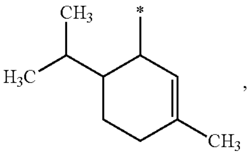
,

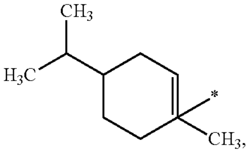
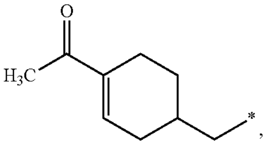

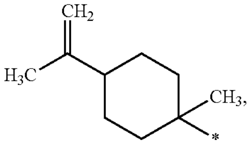
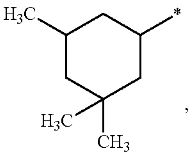
,

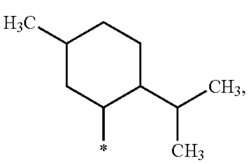
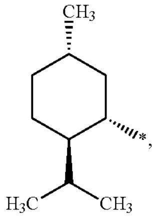

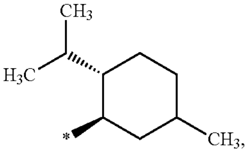
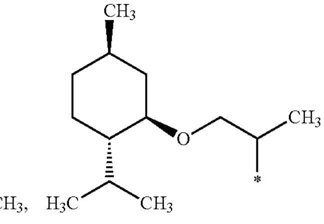
,

-continued

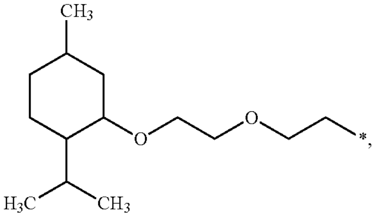

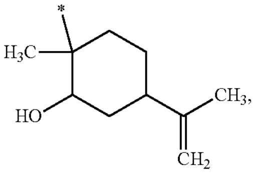
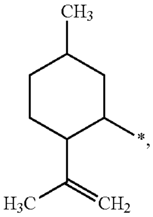

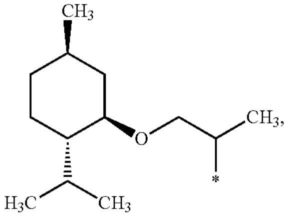

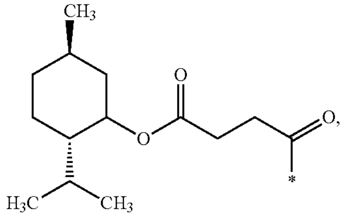

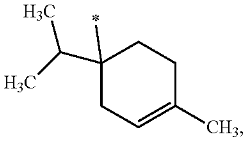
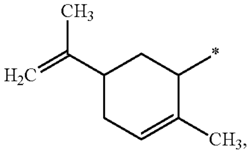

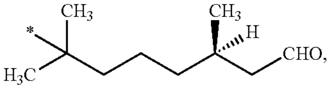

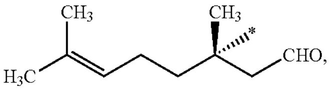

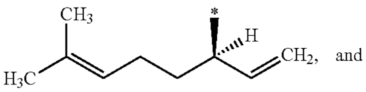
and

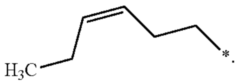

According to an embodiment of the present disclosure, the moiety G' is a moiety derived from the sugar compound, and generated when the hydroxyl group linked to the ring of the sugar compound participates in the ester linkage ( 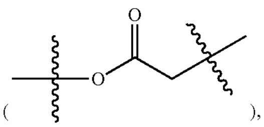 [SMILES: *CC(=O)O*] ), and the moiety G' may correspond to the sugar compound excluding the hydroxyl group. The compound of Formula 1 may maintain the structural stability by lowering volatility at room temperature by linkage of the sugar compound and increase solubility in organic solvents. The compound of Formula 1 may increase the compatibility and/or processability in various matrices (or substrates), and expand its application field to food and a smoking article.

According to an embodiment of the present disclosure, the sugar compound includes a 6-membered ring, a 5-membered ring, or both, and at least one; at least two; at least three; or the whole of hydroxyl groups linked to a ring constituting the sugar compound may participate in the ester linkage of Formula 1. For example, the ester linkage by a single or a plurality of hydroxyl groups may be formed so that a "[ ]" part in Formula 1, that is, a single or a plurality of

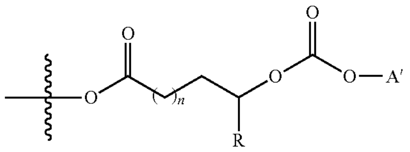

may be linked to the moiety G'.

According to an embodiment of the present disclosure, the m is the number of "[ ]" part, that is,

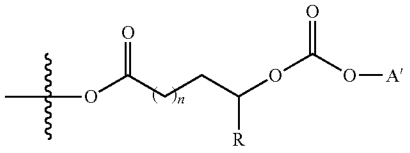

linked to moiety G' by the ester linkage, and may be an integer of 1 to 8; 1 to 7; 1 to 6; 1 to 5; 1 to 4; 1 to 3; or 1 to 2.

According to an embodiment of the present disclosure, the sugar compound may be selected from the group consisting of tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, glucose, idose, talose, erythrurose, xylulose, psicose, turanose, cellobiose, amylopectin, glucosamine, mannosamine, fucose, glucuronic acid, glucosan, gluco-lactone, abequose, galactosamine, isomalto-oligosaccharide, xylooligosaccharide, gentio-oligosaccharide, sorbose, nigerooligosaccharide, palatinose oligosaccharide, fructooligosaccharide, maltotetraol, maltotriol, malto-oligosaccharide, lactulose, melibiose, raffinose, rhamnose and ribose. Preferably, the sugar compound may be glucose, lactose, maltose, galactose, sucrose, D-fructose, gulose, talose and idose.

According to an embodiment of the present disclosure, the flavoring agent may be selected from Formulas 1-1 to 1-9 below.

[Formula 1-1]

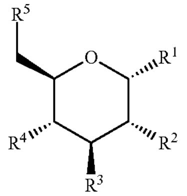

[Formula 1-2]

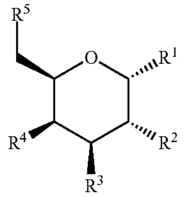

[Formula 1-3]

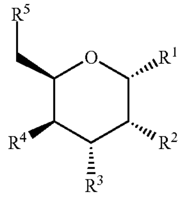

[Formula 1-4]

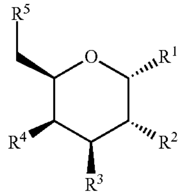

[Formula 1-5]

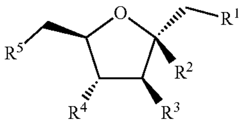

As an example of the present disclosure, in Formulas 1-1 to 1-5, $R^1$ to $R^5$ may be each selected from a hydroxyl group (—OH) and

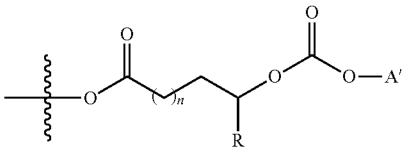

(n, R and A' are as defined in Formula 1).

Preferably,

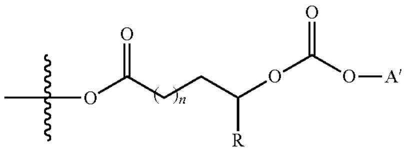

may correspond to at least one; at least two; at least three; at least four; or the whole of $R^1$ to $R^5$, more preferably at least one of $R^1$ and $R^5$ at least one of $R^1$ and $R^4$; and/or at least one of $R^3$ and $R^4$.

[Formula 1-6]

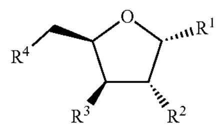

As an example of the present disclosure, in Formula 1-6, $R^1$ to $R^4$ may be each selected from a hydroxyl group (—OH) and

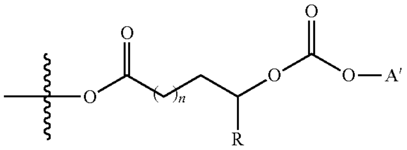

(n, R and A' are as defined in Formula 1).

Preferably,

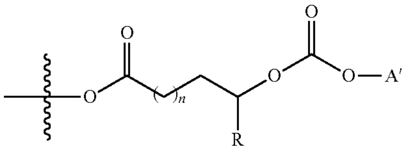

may correspond to at least one; at least two; at least three; or the whole of $R^1$ to $R^4$, more preferably at least one of $R^1$ and $R^4$; at least one of $R^2$ and $R^3$; and/or at least one of $R^1$ and $R^3$.

[Formula 1-7]

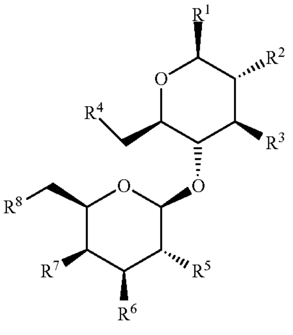

[Formula 1-8]

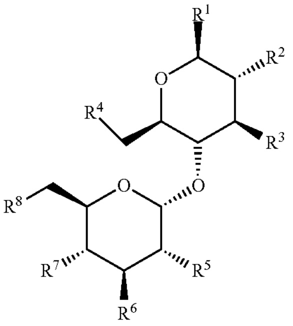

-continued

[Formula 1-9]

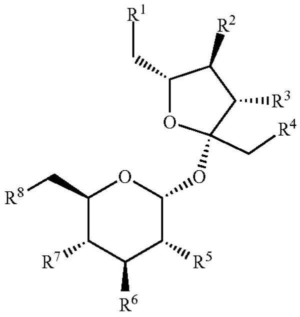

As an example of the present disclosure, in Formulas 1-7 to 1-9, $R^1$ to $R^8$ may be each selected from a hydroxyl group (—OH) and

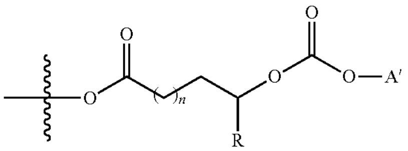

n, R and A' are as defined in Formula 1.1).

Preferably,

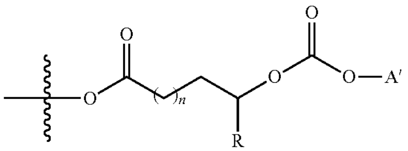

may correspond to at least one; at least two; at least three; at least four; or the whole of $R^1$ to $R^8$, more preferably at least one of $R^1$ to $R^3$; and/or at least one of $R^5$ and $R^8$, much more preferably at least one of $R^1$ and $R^2$; at least one of $R^1$ and $R^3$; at least one of $R^6$ and $R^8$; and/or at least one of $R^7$ and $R^5$.

According to an embodiment of the present disclosure, the flavoring agent may be selected from Formulas 1-1-a to 1-9-a below.

[Formula 1-1-a]

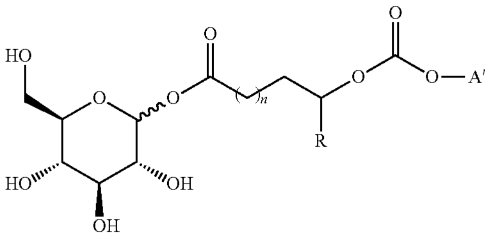

-continued

[Formula 1-2-a]

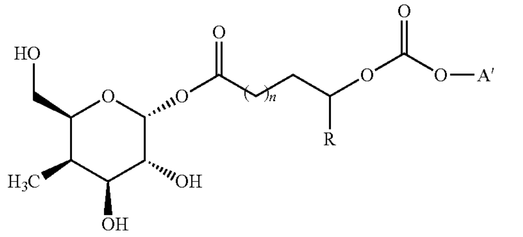

[Formula 1-3-a]

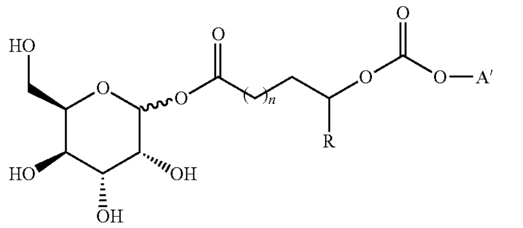

[Formula 1-4-a]

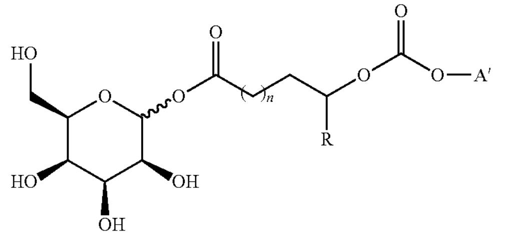

[Formula 1-5-a]

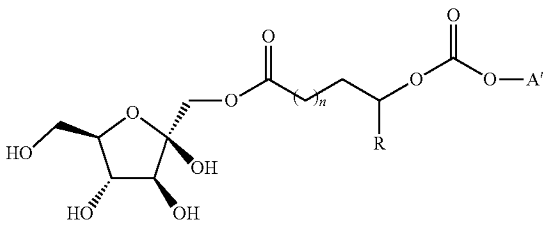

[Formula 1-6-a]

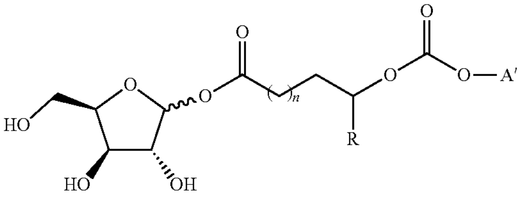

-continued

[Formula 1-7-a]

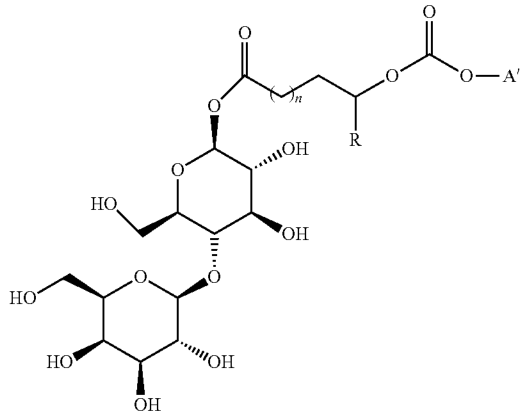

[Formula 1-8-a]

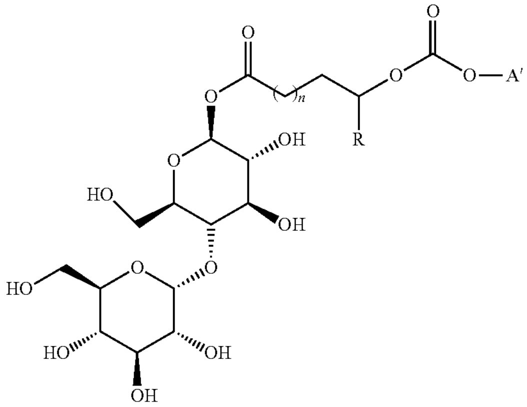

[Formula 1-9-a]

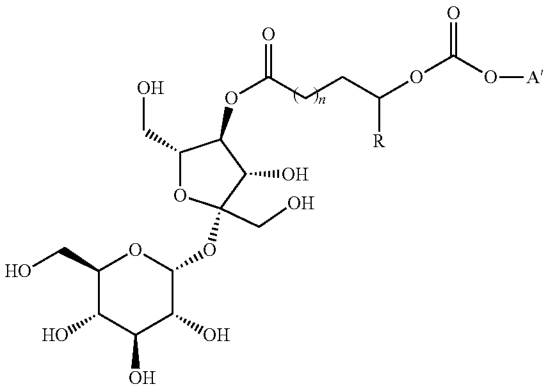

(In which, n, R, and A' are as defined in Formula 1 above.)

According to an embodiment of the present disclosure, in Formula 1, n may be an integer of 1 or 2. R may be a straight-chain or branched-chain alkyl group having 1 to 30 carbon atoms; preferably a straight-chain or branched-chain alkyl group having 2 to 10 carbon atoms.

According to an embodiment of the present disclosure, the lactone compound may be gamma lactone of Formula 2 below or delta lactone of Formula 3 below.

[Formula 2]

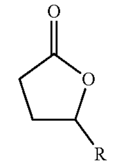

[Formula 3]

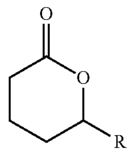

As an example of the present disclosure, in Formulas 1 and 2, R may be a straight-chain or branched-chain alkyl group having 1 to 30 carbon atoms, preferably a straight-chain or branched-chain alkyl group having 2 to 10 carbon atoms.

For example, the lactone compound may be selected from Formulas below.

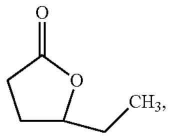

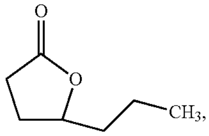

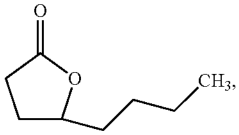

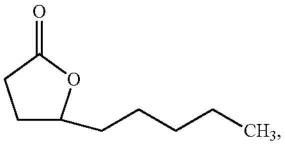

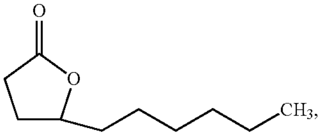

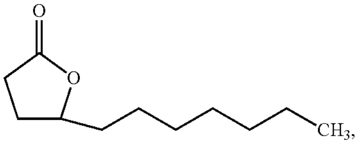

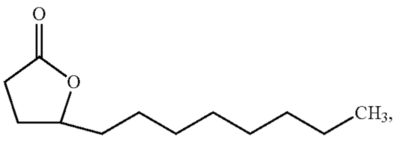

-continued

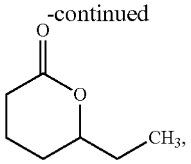

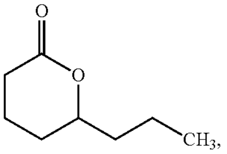

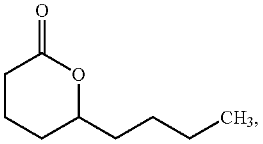

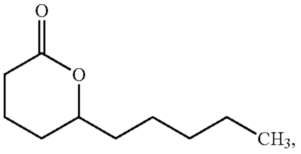

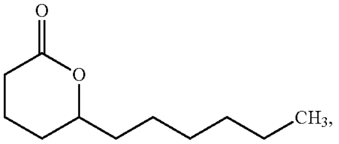

and

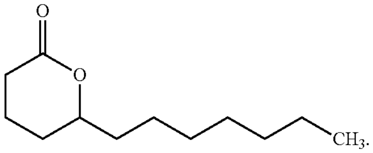

According to an embodiment of the present disclosure, the compound may be pyrolyzed at 70° C. or higher; 80° C. or higher; 90° C. or higher; or 100° C. or higher, preferably 120° C. or higher; 150° C. or higher; 200° C. or higher; or more preferably 200° C. to 300° C. In addition, the compound may be pyrolyzed in an environment containing oxygen and/or moisture.

According to an embodiment of the present disclosure, the flavoring agent may be a flavoring agent for foods and smoking articles. That is, the flavoring agent may be used as an acceptable additive for foods and smoking articles.

The present disclosure relates to a composition including the flavoring agent according to the present disclosure.

According to an embodiment of the present disclosure, the composition may include a flavoring agent (i.e., a flavoring agent compound represented by Formula 1 above) according to the present disclosure, and further include a carrier, an additive, or both depending on the use. The carriers and the additives are acceptable carriers and additives for foods or smoking articles, and may include, for example, solvents, binders, diluents, disintegrants, lubricants, flavoring agents, colorants, preservatives, antioxidants, emulsifiers, stabilizers, flavor enhancers, sweeteners, and the like, but are not limited thereto.

According to an embodiment of the present disclosure, the composition may further include a base matrix (or substrate) component depending on the use, and may be, for example, paper, pulp, wood, polymer resins (e.g., cellulose), fibers, vegetable oils, petroleum oils (e.g., paraffins), animal oils, waxes, fatty acids (e.g., animal fats, vegetable fats, saturated fatty acids, and unsaturated fatty acids (e.g., monoor polyunsaturated fatty acids) having 1 to 50 carbon atoms), etc. Organic and/or inorganic or ceramic powders (e.g., chalk, perlite, vermiculite, diatomaceous earth, colloidal silica, magnesium oxide, magnesium sulfate, magnesium carbonate), wetting agents (e.g., glycerin or propylene glycol), acetate compounds, and the like may be further added in the base matrix component.

According to an embodiment of the present disclosure, the composition may further include a tobacco component depending on the use. The composition may develop flavors in mainstream smoke and/or sidestream smoke under smoking conditions when applied to the smoking article. The tobacco component may be a solid material based on tobacco raw materials such as tobacco sheets, cut tobaccos, and reconstituted tobacco, and may be selected from leaf tobacco, extruded tobacco, and bandcast tobacco. In addition, the composition may further include an aerosol generator that may be applied as a tobacco medium, and the aerosol generator may be sorbitol, glycerol, propylene glycol, triethylene glycol, lactic acid, diacetin, triacetin, triethylene glycol diacetate, triethyl citrate, ethyl myristate, isopropyl myristate, methyl stearate, dimethyl dodecane dioate, dimethyl tetradecanedioate, etc., but is not limited thereto.

According to an embodiment of the present disclosure, the flavoring agent may be included in an amount of 0.0001 wt % or more; 0.001 wt % or more; 0.01 wt % or more; 0.1 wt % to 100 wt % (or less than 100 wt %); 0.1 wt % to 80 wt %; 0.0001 wt % to 60 wt %; 0.001 wt % to 50 wt %; 0.1% to 30 wt %; 1 wt % to 20 wt %; 5 wt % to 20 wt %; or 5 wt % to 10 wt % of the composition. Within the range, it is possible to obtain a flavor developing function of the flavoring agent according to pyrolysis, and to obtain an effect of improving tobacco taste when applied to the smoking article.

According to an embodiment of the present disclosure, the composition may be prepared in various phases, for example, solids (e.g., powder, crystal, flake, pulverized material), slurry, paste, gel, liquid, emulsion, or aerosol. For example, the composition may be molded, mixed into a desired product, or applied by a method known in the art such as printing, dipping, spraying, and/or coating, etc., which is not specifically mentioned in the present disclosure.

The present disclosure relates to a composition including the flavoring agent according to the present disclosure. According to an embodiment of the present disclosure, the food may include at least one or more of the flavoring agent compounds represented by Formula 1 according to the present disclosure. When heating and/or burning the food, it is possible to provide flavor by pyrolysis of the flavoring agent.

According to an embodiment of the present disclosure, the food may be prepared from a food raw material and the flavoring agent or a composition including the flavoring agent. The composition may further include food additives depending on a desired food, and the food additives may include, for example, solvents (e.g., water, alcohol, and liquid extract), binders, diluents (e.g., oil), disintegrants, lubricants, coloring agents, preservatives, antioxidants, emulsifiers, stabilizers, flavor enhancers, sweeteners, and the like, but are not limited thereto. For example, the flavoring agent may be mixed into the food by itself or mixed, dipped, sprayed, and/or coated by using the composition including the flavoring agent.

According to an embodiment of the present disclosure, the food may be semi-cooked or cooked by adding or heating the flavoring agent. When the flavoring agent is added, the food may develop a flavoring agent function through additional heating. In addition, the semi-cooked or cooked food is heated together with the flavoring agent to develop its function, and the flavoring agent is added to the semi-cooked or cooked food to develop its function through additional heating.

According to an embodiment of the present disclosure, the flavoring agent may be 0.0001 wt % or more to 99 wt %; 0.01 wt % or more; 0.1 wt % or more; 1 to 50 wt %; 1 to 30 wt %; or 1 to 20 wt % of the food. Within the range, it is possible to provide the flavor developing function of the flavoring agent and maintain the unique characteristics of the food raw material.

According to an embodiment of the present disclosure, the "food" may be food ingredients, sauces, additives, seasonings, food and beverages, favorite foods, processed foods, frozen foods, refrigerated foods, stored foods, pickled foods, functional foods, and fermented foods. In addition, the food may be in uncooked and added states (e.g., surface-coated state, filled state, seasoned state, pickled state, dried state, mixed state), semi-cooked or cooked foods (e.g., foods completed by applying heat such as baking, steaming, roasting, frying, boiling, or heating). For example, the foods may be cereal products, rice products, tapioca products, sago products, bakery products, rice cake products, biscuit products, pastry products, candy products, dessert products, gum, chewing gum, chocolate, ice cream, honey products, molassic products, yeast products, baking powders, salt and seasoning products, condiments, sweeteners, savory products, mustard products, vinegar products, sauces (condiments), cooked fruit and vegetable products, and meat products, jellies, jams, fruit sauces, egg products, milk and dairy products, cheese products, butter and butter alternatives, milk alternatives, soy products, edible oils and fat products, beverages, alcoholic beverages, beer, carbonated beverages, carbonated water and other non-alcoholic beverages, fruit drinks, fruit juices, coffee, artificial coffee, tea, cocoa, chocolate, candy, extract foods, plant extracts, meat extracts, gelatin, pharmaceuticals, elixirs, syrups, and others preparations for making beverages, but are not limited thereto.

The present disclosure relates to a smoking article including the flavoring agent according to the present disclosure. According to an embodiment of the present disclosure, the smoking article may include at least one or more of the flavoring agent compounds represented by Formula 1 according to the present disclosure described above. When the smoking article is heated and/or burned, it is possible to provide flavor by pyrolysis of the flavoring agent. That is, when the smoking article is heated and/or burned, flavors may be developed in the mainstream smoke and/or sidestream smoke.

According to an embodiment of the present disclosure, the "smoking article" may mean any product capable of smoking or any product capable of providing a smoking experience regardless of whether it is based on tobacco, tobacco derivatives, expanded tobacco, reconstituted tobacco, or tobacco substitutes. For example, the smoking article may refer to a smokable article capable of generating aerosol, such as a cigarette, a cigar, a small cigarillo, or an electronic cigarette. The smoking article may include an aerosol generating material or an aerosol forming substrate. In addition, the smoking article may include solid materials based on tobacco raw materials, such as tobacco sheet, cut tobaccos, reconstituted tobacco, and the like.

According to an embodiment of the present disclosure, the flavoring agent may be included in the smoking article in an amount of 0.0001 parts by weight or more; 0.001 parts by weight or more; 0.1 parts by weight or more; 1 part by weight or more; or 1 to 20 parts by weight with respect to 100 parts by weight of the smoking medium.

According to an embodiment of the present disclosure, the flavoring agent may develop flavoring components, for example, lactone in the smoking article at the time of smoking in an amount of 0.00001 parts by weight or more; 0.0001 parts by weight or more; 0.001 parts by weight or more; 0.1 parts by weight or more; 1 part by weight or more; or 1 to 20 parts by weight with respect to 100 parts by weight of the smoking medium.

According to an embodiment of the present disclosure, the smoking article may be a cigarette type tobacco, a liquid type tobacco, or a hybrid type tobacco, and may be a burned cigarette or heated tobacco. Alternatively, the smoking article may be an electronic cigarette (e.g., an electronically heated cigarette).

According to an embodiment of the present disclosure, the flavoring agent is applied to the cigarette paper of a cigarette to provide an effect of improving the acrid smell of sidestream smoke by developing flavoring components (e.g., lactones and/or fragrance components) by heat during tobacco heating and/or burning, particularly smouldering.

According to an embodiment of the present disclosure, when applied to a medium of a heated tobacco stick, the flavoring agent may impart the flavor persistence of the flavoring components. That is, in the heated tobacco, the flavoring components contained in the medium are exhausted in the initial puffing by static heating, but the flavoring agent is developed only when decomposed by heat, and thus, even if the puffing lasts, the flavoring component is generated even in the last puffing, so that the tobacco taste may be maintained constant.

According to an embodiment of the present disclosure, the smoking article may include or be manufactured with the flavoring agent or the flavoring agent composition. For example, the smoking article may correspond to components and/or parts of the smoking article. The smoking article may preferably be components and/or parts of a region to be heated in the smoking article. For example, the smoking article may be smoking media (e.g., liquids, gels, solids, slurries, pastes), paper tubes, tubes, filters (e.g., tube filters, fabric filters, woven fabric filters, paper filters, capsule filters), roll paper, cigarette paper, tip paper, wrappers, cartridges (e.g., heated cartridges), and the like, which include components known in the art of the present disclosure and are not specifically mentioned in the present disclosure, unless departing from the object of the present disclosure.

According to an embodiment of the present disclosure, the flavoring agent may be applied to be mixed with a substrate or base by itself or to be mixed, printed, dipped (or impregnated), coated, and/or sprayed with the substrate or base using the composition including the flavoring agent in the manufacture of the smoking article.

According to an embodiment of the present disclosure, the smoking medium, for example, a flavoring agent and a tobacco raw material (e.g., medium raw material, tobacco leaves) may be included or additives may be further included. In another example, the flavoring agent is added as a flavoring agent when preparing components and/or parts of the smoking article, and may be mixed with a base material, a solvent, a flavoring substance, a smoking medium substance, and the like, which are applicable to the smoking article. Alternatively, the smoking medium may be liquid, gel, or solid.

Hereinafter, the present disclosure will be described in more detail with reference to examples and comparative examples. However, the following examples are just illustrative of the present disclosure, and the contents of the present disclosure are not limited to the following examples.

Example 1

[Reaction Formula 1]

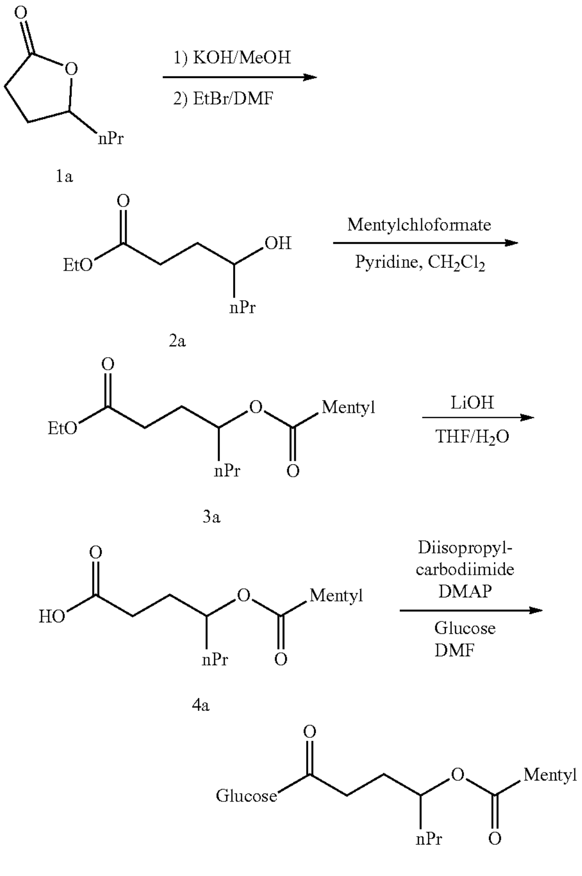

1a

2a

3a

4a

5a

(1-1) Synthesis of ethyl 4-hydroxyheptanoate (2a)

20 g (0.15 mol) of γ-heptalactone was dissolved in 100 mL of methanol, slowly added with 11.17 g (0.16 mol, 1.05 eq.) of KOH while stirring, and reacted at room temperature for 12 hours. The reaction solution was concentrated under reduced pressure, added with 80 mL of DMF, added with 17 g (0.15 mol, 1 eq.) of bromoethane while stirring, and then reacted for 12 hours. The reaction solution was added with 100 mL of water, extracted with ethyl acetate, and washed with water and salt water. The organic layer was dried with $MgSO_4$ and then concentrated under reduced pressure to obtain 18.1 g (66.7%, 2 steps) of a target product 2a.

$^1H$ NMR ($CDCl_3$, 400.13 MHz); δ8.01 (s, 1H, —OH), 4.12 (q, 2H, J=8 Hz, COO—$CH_2$—), 3.63 (in, 1H, CH—O), 2.42 (in, 2H, CO—$CH_2$), 1.81~0.92 (in, 12H, alkyl)

(1-2) Synthesis of ethyl 4-(menthylcarbonyloxy)heptanoate (3a)

18 g (0.1 mol) of ethyl 4-hydroxyheptanoate (2a) was dissolved in 120 mL of THF, added with 16 g (0.2 mol, 2 eq.)

of pyridine, cooled with ice water, and slowly dropped with 23 g (0.1 mol, 1 eq.) of menthyl chloroformate in a 20 mL of THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution, and salt water, and then dried with $MgSO_4$ and concentrated under reduced pressure to obtain 30 g (yield 81%) of a target object 3a as a yellow liquid.

$^1H$ NMR ($CDCl_3$, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—$CH_2$—), 2.36 (m, 2H, CO—$CH_2$—), 1.93~0.79 (m, 30H, alkyl)

(1-3) Synthesis of 4-(menthylcarbonyloxy)heptanoic acid (4a)

25 g (68.5 mmol) of ethyl 4-(menthylcarbonyloxy)heptanoate (3a) was dissolved in 100 mL of THF and 30 mL of distilled water, and added with 4.2 g (102.4 mmol, 1.5 eq.) of lithium hydroxide monohydrate and reacted at room temperature for 12 hours. The reaction solution was added with 50 mL of distilled water and extracted with ether. The water layer was adjusted to pH 3 by adding thick hydrochloric acid and then extracted with ethyl acetate. The organic layer was washed with salt water, dried with $MgSO_4$, and concentrated under reduced pressure to obtain 21.8 g (yield: 81%) of a target product 4a as a yellow liquid.

$^1H$ NMR ($CDCl_3$, 400.13 MHz); δ4.76 (m, 1H, —COOCH—), 4.52 (td, 1H, J=9, 4 Hz, COO—CH—), 4.11 (q, 2H, J=8 Hz, COO—$CH_2$—), 2.42 (m, 2H, CO—$CH_2$—), 1.99~0.82 (m, 27H, alkyl)

(1-4) Synthesis of glucosyl-(4-menthylcarbonyloxy)heptanoate (5a)

3 g (9.1 mmol) of 4-(menthylcarbonyloxy)heptanoic acid (4a) was dissolved in 20 mL of DMF, and added with 3.7 g (20.5 mmol, 2.2 eq.) of glucose. While stirring at room temperature, 1.7 g (13.4 mmol, 1.5 eq.) of diisopropylcarbodiimide and 0.05 g (cat.) of DMAP were sequentially added thereto, and then reacted at room temperature for 12 hours. The reactant was added with distilled water and extracted with ethyl acetate. The organic layer was washed with dilute hydrochloric acid, a saturated sodium bicarbonate solution, and salt water, respectively, dried with $MgSO_4$, and concentrated under reduced pressure. The mixture was subjected to silica gel column chromatography using a mixed solvent (6:1) of methylene chloride and methanol to obtain 0.6 g (yield: 13%) of a target product 5a.

$^1H$ NMR ($CDCl_3$, 400.13 MHz); δ5.30~3.54 (m, 13H, glucose, —COOCH, —COOCH), 2.45 (m, 2H, CO—$CH_2$—), 2.03~0.78 (m, 27H, alkyl).

2. Synthesis of glucosyl-(4-menthylcarbonyloxy)nonanoate (5b)

[Reaction Formula 2]

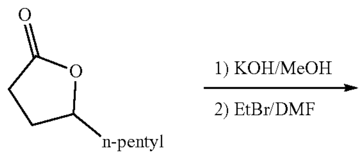

1b

-continued

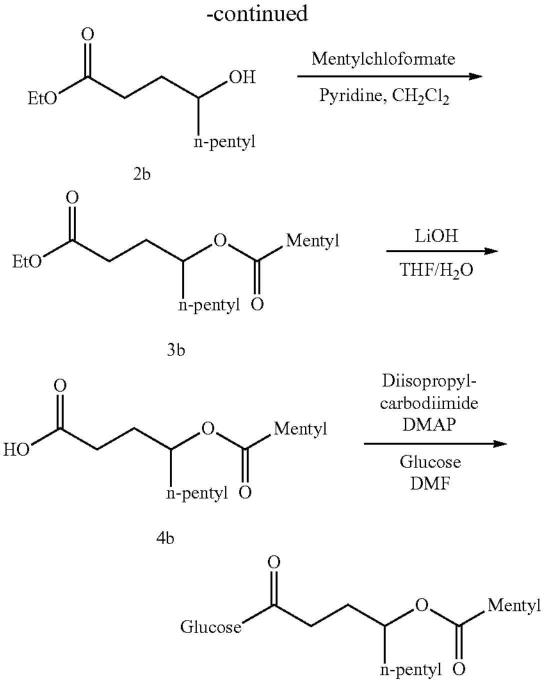

2b

3b

4b

5b (2-1) Synthesis of ethyl 4-hydroxynonanoate (2b 20 g (0.13 mol) γ-nonalactone was dissolved in 100 mL of methanol, slowly added with 9.18 g (0.14 mol, 1.05 eq.) of KOH while stirring, and reacted at room temperature for 12 hours. The reaction solution was concentrated under reduced pressure, added with 80 mL of DMF, added with 14 g (0.13 mol, 1 eq.) of bromoethane while stirring, and then reacted for 12 hours. The reaction solution was added with 100 mL of water, extracted with ethyl acetate, and washed with water and salt water. The organic layer was dried with $MgSO_4$ and then concentrated under reduced pressure to obtain 24 g (93%, 2 steps) of a target product 2b.

(2-2) Synthesis of ethyl 4-(menthylcarbonyloxy)nonanoate (3b)

24 g (0.12 mol) of ethyl 4-hydroxyundecanoate (2) was dissolved in 120 mL of THF, added with 18 g (0.42 mol, 2 eq.) of pyridine, cooled with ice water, and slowly dropped with 26 g (0.12 mol, 1 eq.) of menthyl chloroformate in a 30 mL of THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution, and salt water, and then dried with $MgSO_4$ and concentrated under reduced pressure to obtain 34 g (yield 74.5%) of a target object 3b as a yellow liquid.

$^1H$ NMR ($CDCl_3$, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—$CH_2$—), 2.36 (m, 2H, CO—$CH_2$—), 1.93~0.79 (m, 23H, alkyl)

(2-3) Synthesis of 4-(menthylcarbonyloxy)nonanoic acid (4b)

11.5 g (29.9 mmol) of ethyl 4-(menthylcarbonyloxy) nonanoate (3) was dissolved in 50 mL of THF and 20 mL of distilled water, and added with 2 g (48.7 mmol, 1.6 eq.) of lithium hydroxide monohydrate and reacted at room temperature for 12 hours. The reaction solution was added with 50 mL of distilled water and extracted with ether. The water layer was adjusted to pH 3 by adding thick hydrochloric acid and then extracted with ethyl acetate. The organic layer was washed with salt water, dried with $MgSO_4$, and concentrated under reduced pressure to obtain 8.6 g (yield: 80%) of a target product 4b as a yellow liquid.

$^1$H NMR ($CDCl_3$, 400.13 MHz); δ4.75 (m, 1H, —COOCH—), 4.49 (m, 1H, COO—CH—), 2.04 (m, 2H, CO—$CH_2$—), 1.93~0.79 (m, 31H, alkyl)

(2-4) Synthesis of glucosyl-(4-menthylcarbonyloxy)nonanoate (5b)

6.6 g (24.1 mmol) of 4-(menthylcarbonyloxy)nonanoic acid (4b) was dissolved in 30 mL of DMF, and added with 13 g (72.1 mmol, 3eq.) of glucose. While stirring at room temperature, 3.4 g (26.9 mmol, 1.2 eq.) of diisopropylcarbodiimide and 0.05 g (cat.) of DMAP were sequentially added thereto, and then reacted at room temperature for 12 hours. The reactant was added with distilled water and extracted with ethyl acetate. The organic layer was washed with dilute hydrochloric acid, a saturated sodium bicarbonate solution, and salt water, respectively, dried with $MgSO_4$, and concentrated under reduced pressure. The mixture was subjected to silica gel column chromatography using a mixed solvent (8:1) of methylene chloride and methanol to obtain 2 g (yield 16%) of a target product 5b.

$^1$H NMR ($CDCl_3$, 400.13 MHz); δ5.57~3.35 (m, 13H, glucose, —COOCH, —COOCH), 2.43 (m, 2H, CO—$CH_2$—), 2.03~0.78 (m, 31H, alkyl).

3. Synthesis of glucosyl-(5-menthylcarbonyloxy)decanoate (6c)

[Reaction Formula 3]

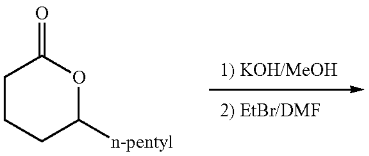

1c

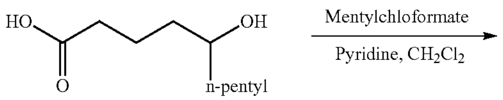

2c

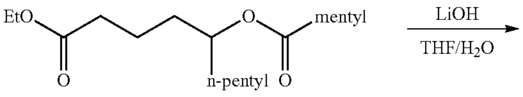

3c

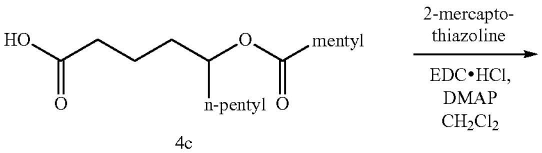

4c

-continued

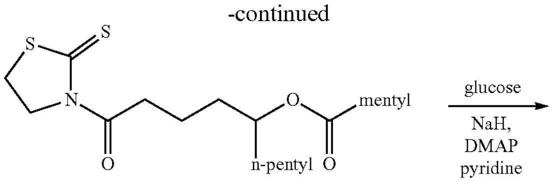

5c

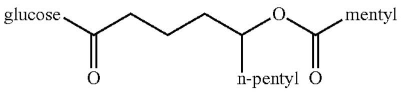

6c

(3-1) Synthesis of ethyl 5-hydroxydecanoate (2c)

10 g (58.7 mmol) of 6-decalactone was dissolved in 50 mL of methanol, slowly added with 4.2 g (64.7 mmol, 1.05 eq.) of KOH while stirring, and reacted at room temperature for 12 hours. The reaction solution was concentrated under reduced pressure, added with 40 mL of DMF, added with 6.4 g (58.7 mmol, 1 eq.) of bromoethane while stirring, and then reacted for 12 hours.

The reaction solution was added with 100 mL of water, extracted with ethyl acetate, and washed with water and salt water. The organic layer was dried with $MgSO_4$ and then concentrated under reduced pressure to obtain 7.6 g (60%, 2 steps) of a target product 2c.

(3-2) Synthesis of ethyl 5-(menthylcarbonyloxy)decanoate (3c)

7.5 g (34.6 mmol) of ethyl 4-hydroxynonanoate (3c) was dissolved in 50 mL of THF, added with 5.3 g (69.2 mmol, 2 eq.) of pyridine, cooled with ice water, and slowly dropped with 8.3 g (37.9 mmol, 1.1 eq.) of menthyl chloroformate in a 20 mL of THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution and salt water, respectively, dried with $MgSO_4$, and concentrated under reduced pressure. The mixture was subjected to silica gel column chromatography using a mixed solvent (7:1) of n-hexane and ethyl acetate to obtain 4.5 g (yield 32.6%) of a target product 3c.

$^1$H NMR ($CDCl_3$, 400.13 MHz); δ4.72 (m, 1H, —COOCH—), 4.52 (m, 1H, COO—CH—), 4.12 (q, 2H, J=8 Hz, COO—$CH_2$—), 2.31 (t, 2H, J=8 Hz, CO—$CH_2$—), 2.08~0.86 (m, 27H, alkyl), 0.79 (d, 6H, J=8 Hz, —$CH_3$).

(3-3) Synthesis of 5-(menthylcarbonyloxy)decanoic acid (4c)

2.7 g (6.8 mmol) of ethyl 4-(menthylcarbonyloxy) nonanoate (3) was dissolved in 20 mL of THF and 10 mL of distilled water, and added with 0.42 g (10.2 mmol, 1.5 eq.) of lithium hydroxide monohydrate and reacted at room temperature for 12 hours. The reaction solution was added with 10 mL of distilled water and extracted with ether. The water layer was adjusted to pH 3 by adding thick hydrochloric acid and then extracted with ethyl acetate. The organic layer was washed with salt water, dried with $MgSO_4$, and concentrated under reduced pressure to obtain 2.1 g (yield: 78%) of a target product 4c as a yellow liquid.

$^1$H NMR ($CDCl_3$, 400.13 MHz); δ4.72 (m, 1H, —COOCH—), 4.51 (td, 1H, J=8, 4 Hz, COO—CH—), 4.11 (q, 2H, J=8 Hz, COO—$CH_2$—), 2.38 (m, 2H, CO—$CH_2$—), 2.06~0.78 (m, 33H, alkyl)

(3-4) Synthesis of 5-isopropyl-2-methylcyclohexyl (1-oxo-1-(2-thioxothiazolidin-3-yl)decan-5-yl)carbonate (5c)

1.9 g (5.1 mmol) of 5-(menthylcarbonyloxy)decanoic acid (4c) was dissolved in 20 mL of dried dichloromethane, added with 0.73 g (6.1 mmol, 1.2 eq.) of 2-mercaptothiazoline, cooled with ice water, and slowly added with 1.2 g (6.1 mmol, 1.2 eq.) of EDC.HCl and 50 mg of DMAP while stirring and reacted. After 1 hour, the reaction solution was heated to room temperature and reacted overnight, and then added with water and extracted with dichloromethane. The organic layer was washed with dilute hydrochloric acid, a saturated sodium bicarbonate solution, and salt water, respectively, dried with $MgSO_4$, and concentrated under reduced pressure. The mixture was subjected to silica gel column chromatography using a mixed solvent (3:1) of n-hexane and ethyl acetate to obtain 2.1 g (yield 87.5%) of a target product 5c.

$^1$H NMR ($CDCl_3$, 400.13 MHz); δ4.71 (m, 1H, —COOCH—), 4.57 (t, 2H, J=8 Hz, N—$CH_2$), 4.51 (m, 1H, COO—CH—), 4.11 (q, 2H, J=8 Hz, COO—$CH_2$—), 3.28 (t, 2H, J=8 Hz, S—$CH_2$), 3.21 (m, 2H, CO—$CH_2$—), 2.04~0.79 (m, 33H, alkyl).

(3-5) Synthesis of glucosyl-(5-menthylcarbonyloxy)decanoate (6c)

2.2 g (4.7 mmol) of 5-isopropyl-2-methylcyclohexyl (1-oxo-1-(2-thioxothiazolidin-3-yl)decan-5-yl) carbonate (5c) was dissolved in 20 mL of pyridine and added with 2.5 g (14.1 mmol, 3 eq.) of glucose. While stirring at room temperature, 93 mg (2.4 mmol, 0.5 eq.) of sodium hydride (60%) and 0.03 g (cat.) of DMAP were sequentially added thereto, and then reacted at room temperature for 12 hours. The reactant was added with 0.5 mL of acetic acid, added with saturated salt water, and then extracted with ethyl acetate. The organic layer was dried with $MgSO_4$ and concentrated under reduced pressure. The mixture was subjected to silica gel column chromatography using a mixed solvent (8:1) of methylene chloride and methanol to obtain 0.55 g (yield 22%) of a target product 6c.

$^1$H NMR ($CDCl_3$, 400.13 MHz); δ5.57~3.15 (m, 13H, glucose, —COOCH, —COOCH), 2.36 (m, 2H, CO—$CH_2$—), 2.05~0.80 (m, 33H, alkyl).

4. Synthesis of glucosyl-(4-menthylcarbonyloxy)undecanoate (6d)

[Reaction Formula 4]

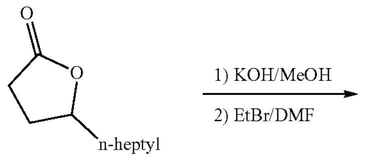

1d

-continued

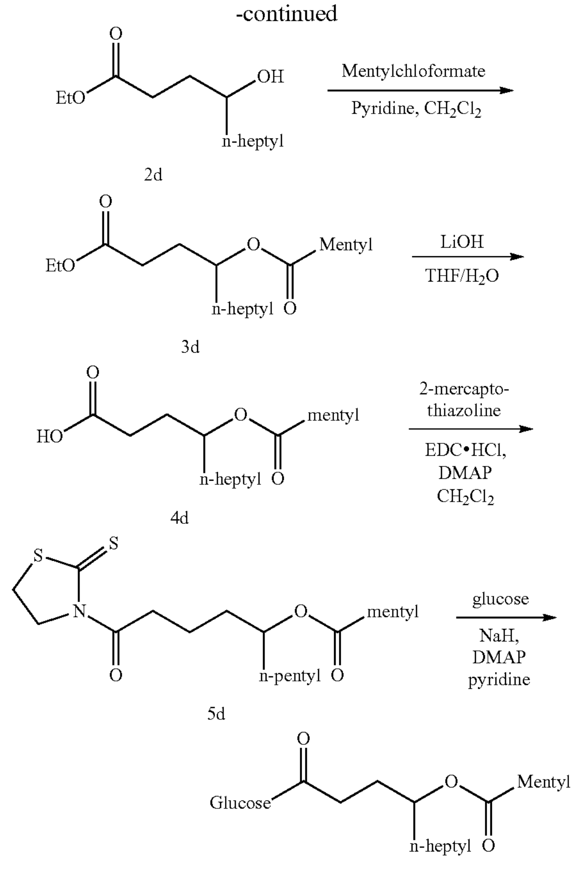

2d

3d

4d

5d

6d

(4-1) Synthesis of ethyl 4-hydroxyundecanoate (2d)

10 g (54.2 mmol) of γ-undecalactone was dissolved in 50 mL of methanol, slowly added with 3.9 g (56.9 mmol, 1.05 eq.) of KOH while stirring, and reacted at room temperature for 12 hours. The reaction solution was concentrated under reduced pressure, added with 50 mL of DMF, added with 5.9 g (54.2 mmol, 1 eq.) of bromoethane while stirring, and then reacted for 12 hours.

The reaction solution was added with 80 mL of water, extracted with ethyl acetate, and washed with water and salt water. The organic layer was dried with $MgSO_4$ and then concentrated under reduced pressure to obtain 10.7 g (85.6%, 2 steps) of a target product 2d.

$^1$H NMR ($CDCl_3$, 400.13 MHz); δ4.12 (q, 2H, J=8 Hz, COO—$CH_2$—), 3.59 (m, 1H, CH—O), 2.43 (m, 2H, CO—$CH_2$), 1.81~0.92 (m, 20H, alkyl)

(4-2) Synthesis of ethyl 4-(menthylcarbonyloxy)undecanoate (3d)

11 g (47.7 mmol) of ethyl 4-hydroxyundecanoate (2d) was dissolved in 60 mL of THF, added with 6.8 g (95.5 mmol, 2 eq.) of pyridine, cooled with ice water, and slowly dropped with 10.5 g (47.7 mmol, 1 eq.) of menthyl chloroformate in a 20 mL of THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution, and salt water, respectively, and then dried with $MgSO_4$ and concentrated under reduced pressure to obtain 8.3 g (yield 42.1%) of a target object 3d as a yellow liquid.

$^1$H NMR ($CDCl_3$, 400.13 MHz); δ4.74 (7tet, 1H, J=4 Hz, —COOCH—), 4.51 (td, 1H, J=9, 4 Hz, COO—CH—), 4.12 (q, 2H, J=8 Hz, COO—$CH_2$—), 2.36 (m, 2H, CO—$CH_2$—), 1.93~0.79 (m, 23H, alkyl)

(4-3) Synthesis of 4-(menthylcarbonyloxy)undecanoic acid (4d)

8.3 g (19.4 mmol) of ethyl 4-(menthylcarbonyloxy)undecanoate (3d) was dissolved in 30 mL of THF and 20 mL of distilled water, and added with 1.2 g (29.1 mmol, 1.5 eq.) of lithium hydroxide monohydrate and reacted at room temperature for 12 hours. The reaction solution was added with 20 mL of distilled water and extracted with ether. The water layer was adjusted to pH 3 by adding thick hydrochloric acid and then extracted with ethyl acetate. The organic layer was washed with salt water, dried with $MgSO_4$ and concentrated under reduced pressure. The mixture was subjected to silica gel column chromatography using a mixed solvent (8:1) of n-hexane and ethyl acetate to obtain 6.8 g (yield 91.8%) of a target product 4d.

$^1$H NMR ($CDCl_3$, 400.13 MHz); δ4.75 (m, 1H, —COOCH—), 4.51 (m, 1H, COO—CH—), 2.43 (m, 2H, CO—$CH_2$—), 2.17~0.78 (m, 35H, alkyl)

(4-4) Synthesis of 5-isopropyl-2-methylcyclohexyl (1-oxo-1-(2-thioxothiazolidin-3-yl)dodecan-5-yl) carbonate (5d)

9.1 g (23.6 mmol) of 5-(menthylcarbonyloxy)undecanoic acid (4d) was dissolved in 20 mL of dried dichloromethane, added with 3 g (24.8 mmol, 1.05 eq.) of 2-mercaptothiazoline, cooled with ice water, and slowly added with 5 g (25.9 mmol, 1.1 eq.) of EDC.HCl and 20 mg of DMAP, respectively, while stirring and reacted. After 1 hour, the reaction solution was heated to room temperature and reacted overnight, and then added with water and extracted with dichloromethane. The organic layer was washed with dilute hydrochloric acid, a saturated sodium bicarbonate solution and salt water, respectively, and then dried with $MgSO_4$ and concentrated under reduced pressure to obtain 10.9 g (yield 92%) of a target object 5d.

$^1$H NMR ($CDCl_3$, 400.13 MHz); δ4.71 (m, 1H, —COOCH—), 4.57 (t, 2H, J=8 Hz, N—$CH_2$), 4.51 (m, 1H, COO—CH—), 4.11 (q, 2H, J=8 Hz, COO—$CH_2$—), 3.28 (t, 2H, J=8 Hz, S—$CH_2$), 3.21 (m, 2H, CO—$CH_2$—), 2.04~0.79 (m, 33H, alkyl).

(4-5) Synthesis of glucosyl-(4-menthylcarbonyloxy)undecanoate (6d)

4.9 g (12.7 mmol) of 4-(menthylcarbonyloxy)undecanoic acid was dissolved in 30 mL of dichloromethane, added with 3 g (25.2 mmol, 2 eq.) of thionyl chloride, and then refluxed for 2 hours. 6.9 g (3 eq.) of glucose and 4.9 g (5 eq.) of pyridine were added to a DMF solvent in another flask, and the reaction solution was slowly added dropwise while stirring at room temperature, and then reacted for 12 hours. The reaction solution was added with water and extracted with dichloromethane. The organic layer was washed with dilute hydrochloric acid, a saturated sodium bicarbonate solution, and salt water, respectively, dried with $MgSO_4$, concentrated under reduced pressure, and subjected to silica gel column chromatography (MC/MeOH, 10:1) to obtain 2.6 g (37.7% yield) of a target product 6d.

$^1$H NMR ($CDCl_3$, 400.13 MHz); δ5.23~3.35 (m, 13H, glucose, —COOCH, —COOCH), 2.43 (m, 2H, CO—$CH_2$—), 2.03~0.78 (m, 35H, alkyl).

5. Synthesis of glucosyl-(4-benzyloxycarbonyloxy)undecanoate (5e)

[Reaction Formula 5]

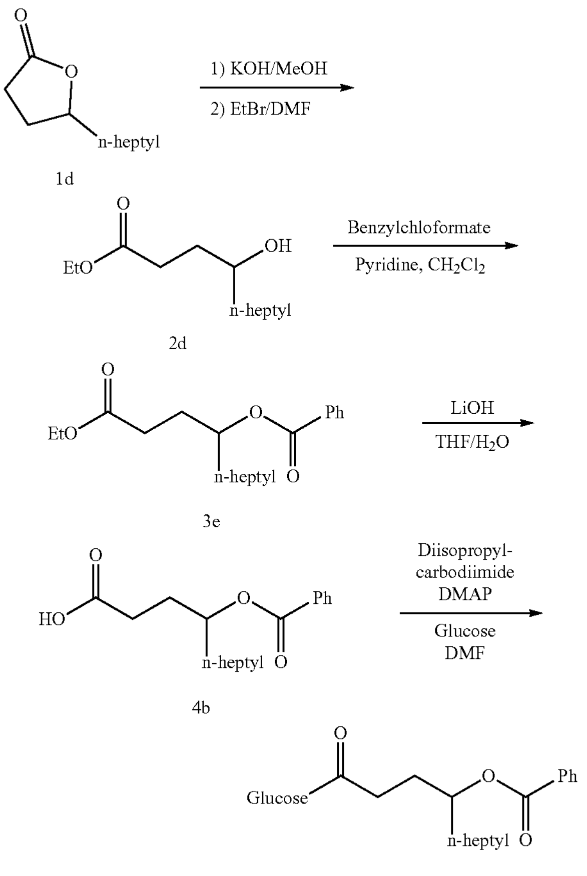

1d

2d

3e

4b

5e

(5-1) Synthesis of ethyl 4-hydroxyundecanoate (2d)

10 g (54.2 mmol) of γ-undecalactone was dissolved in 50 mL of methanol, slowly added with 3.9 g (56.9 mmol, 1.05 eq.) of KOH while stirring, and reacted at room temperature for 12 hours. The reaction solution was concentrated under reduced pressure, added with 50 mL of DMF, added with 5.9 g (54.2 mmol, 1 eq.) of bromoethane while stirring, and then reacted for 12 hours.

The reaction solution was added with 80 mL of water, extracted with ethyl acetate, and washed with water and salt water. The organic layer was dried with $MgSO_4$ and then concentrated under reduced pressure to obtain 10.7 g (85.6%, 2 steps) of a target product 2d.

$^1$H NMR ($CDCl_3$, 400.13 MHz); δ4.12 (q, 2H, J=8 Hz, COO—$CH_2$—), 3.59 (m, 1H, CH—O), 2.43 (m, 2H, CO—$CH_2$), 1.81~0.92 (m, 20H, alkyl)

(5-2) Synthesis of ethyl 4-(benzyloxycarbonyloxy)undecanoate (3e)

Figure 24:
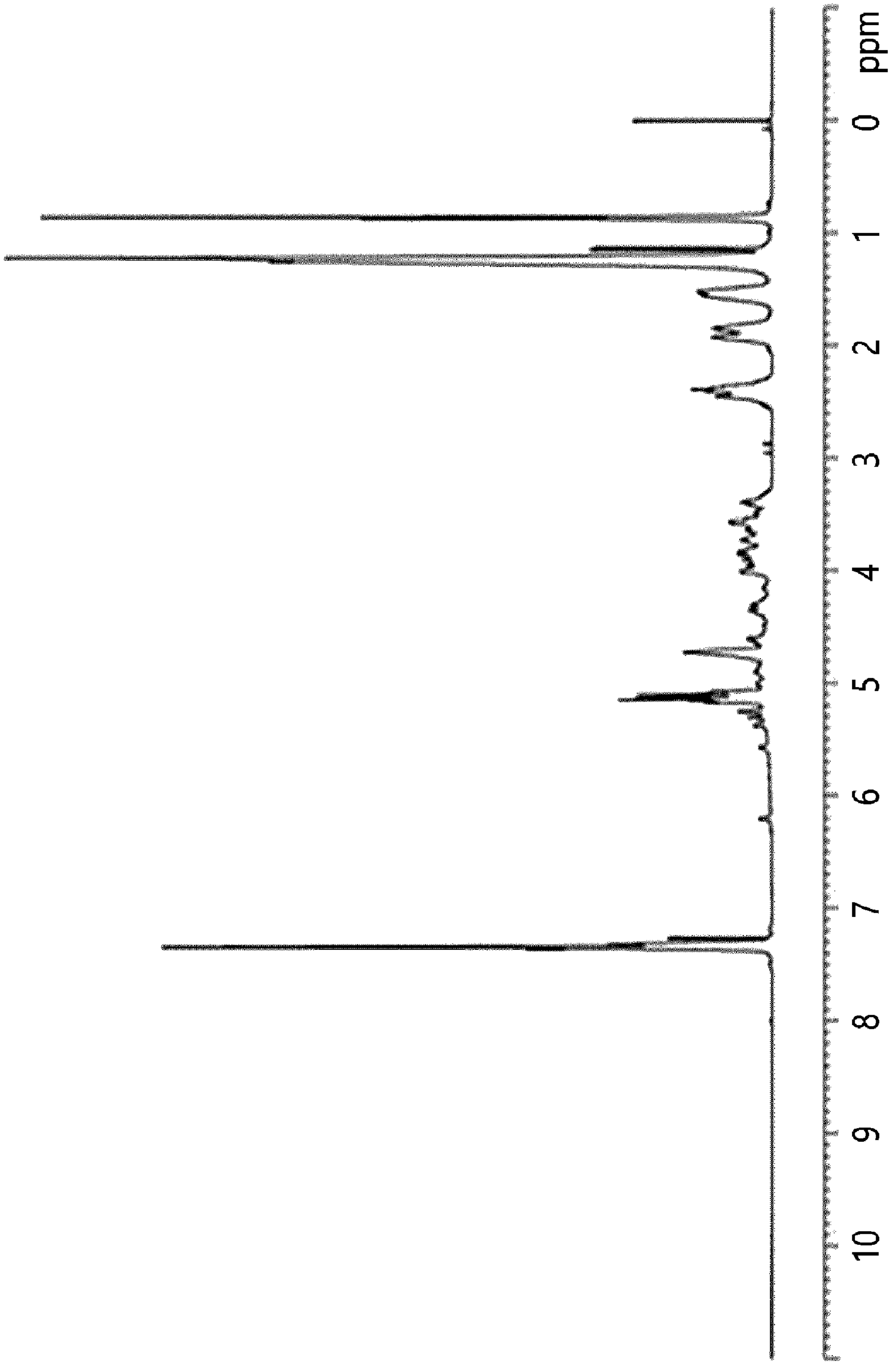
FIG. 24 illustrates results of NMR analysis of glucosyl-(4-benzyloxycarbonyloxy)nonanoate (5e) prepared in examples, according to an embodiment of the present disclosure.

8.3 g (36 mmol) of ethyl 4-hydroxyundecanoate (2d) was dissolved in 50 mL of THF, added with 5.5 g (72.3 mmol, 2 eq.) of pyridine, cooled with ice water, and slowly dropped with 6.1 g (35.3 mmol, 1 eq.) of benzylchloroformate in a 20 mL THF solution while stirring. After 1 hour, the reaction solution was heated to room temperature and reacted overnight, and then added with water and extracted with ethyl acetate. The organic layer was washed with dilute hydrochloric acid, a saturated sodium bicarbonate solution, and salt water, respectively, and then dried with $MgSO_4$ and concentrated under reduced pressure to obtain 9.9 g (yield 75.6%) of a target object 3e as a yellow liquid. $^1H$ NMR ($CDCl_3$, 400.13 MHz); δ7.37~7.34 (m, 5H, ph), 5.14 (m, 2H, O—$CH_2$-Ph), 4.12 (brs, 1H, O—CH—), 2.42 (m, 2H, CO—$CH_2$—), 1.90~0.79 (m, 21H, alkyl) (FIG. 24).

(5-3) Synthesis of 4-(benzyloxycarbonyloxy)undecanoic acid (4e)

10 g (27.5 mmol) of ethyl 4-(benzyloxycarbonyloxy) undecanoate (3e) was dissolved in 30 mL of THF and 20 mL of distilled water, and added with 1.7 g (41.4 mmol, 1.5 eq.) of lithium hydroxide monohydrate and reacted at room temperature for 12 hours. The reaction solution was added with 20 mL of distilled water and extracted with ether. The water layer was adjusted to pH 3 by adding thick hydrochloric acid and then extracted with ethyl acetate. The organic layer was washed with salt water, dried with $MgSO_4$, and concentrated under reduced pressure to obtain 8.2 g (yield: 89%) of a target product 4e.

$^1H$ NMR ($CDCl_3$, 400.13 MHz); δ7.37~7.35 (m, 5H, ph), 5.14 (m, 2H, O—$CH_2$-Ph), 4.48 (m, 1H, O—CH—), 2.47 (m, 2H, CO—$CH_2$—), 1.90~0.79 (m, 21H, alkyl)

(5-4) Synthesis of glucosyl-(4-benzyloxycarbonyloxy)nonanoate (5e)

8 g (23.8 mmol) of 4-(benzyloxycarbonyloxy)undecanoic acid (4e) was dissolved in 30 mL of DMF, and added with 13 g (72.1 mmol, 3eq.) of glucose. While stirring at room temperature, 3.4 g (26.9 mmol, 1.1 eq.) of diisopropylcarbodiimide and 0.05 g (cat.) of DMAP were sequentially added thereto, and then reacted at room temperature for 12 hours. The reactant was added with distilled water and extracted with ethyl acetate. The organic layer was washed with dilute hydrochloric acid, a saturated sodium bicarbonate solution, and salt water, respectively, dried with $MgSO_4$, and concentrated under reduced pressure. The mixture was subjected to silica gel column chromatography using a mixed solvent (8:1) of methylene chloride and methanol to obtain 0.3 g (yield 2.5%) of a target product 5e.

$^1H$ NMR ($CDCl_3$, 400.13 MHz); δ7.37~7.34 (m, 5H, ph), 5.30~3.37 (m, 13H, glucose, —COOCH, —COOCH), 2.39 (m, 2H, CO—$CH_2$—), 1.92~0.84 (m, 17H, alkyl).

Experimental Example

A pyrolysis test was performed to confirm the pyrolytic behavior of the 6d compound (2C) when exposed to heat, which was observed by a commonly known pyrolysis-gas chromatography/mass spectrometry [Py-GC/MS]method. A pyrolyzer performed the 『Double-Shot Pyrolyzer 2020iD 』 (Frontier Lab, Japan) in a system connected to the GC/MS (Agilent 6890 GC, USA/Aginelt 7890 MSD, USA) equipment. 2C was diluted in an ethyl alcohol solution at a concentration of 2.5%, and then 10 μl was loaded into a pyrolyzer sample cup and pyrolyzed. The pyrolysis temperature was specified as a temperature of the furnace of a double-shot pyrolyzer to control a temperature experienced by the sample, but a first pyrolysis temperature allowed the target compound (2C) in the sample cup to undergo pyrolysis by exposing a sample cup in which the sample was placed to the furnace at 80° C. for 30 seconds. Components generated by heat or volatilized by heat were immediately injected into an injector of GC/MS and separated. During GC/MS analysis after pyrolysis, the sample cup was removed from the furnace so as not to be affected by the pyrolysis temperature, and after the GC/MS analysis by the first pyrolysis was completed, the first used sample cup was subjected to pyrolysis again without injecting a new compound, and at this time, the pyrolysis temperature was 90° C. higher by 10° C. and the pyrolysis was performed for 30 seconds. Also, after the pyrolysis was completed, the sample cup was removed from the furnace so as not to be affected by the pyrolysis temperature. In this way, the pyrolysis test was performed while the temperature rose from 80° C., 90° C., and 100° C. to final 320° C. at the time of pyrolysis after loading the first sample into the sample cup. As a result, the pyrolytic characteristics of the compounds experienced while the pyrolysis temperature increased were separately observed for each temperature range. The results were illustrated in FIGS. 25 and 26.

[Pyrolysis mechanism]

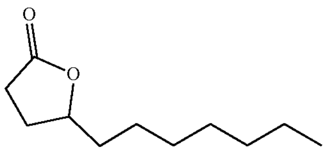

[1C]

⑫

-continued

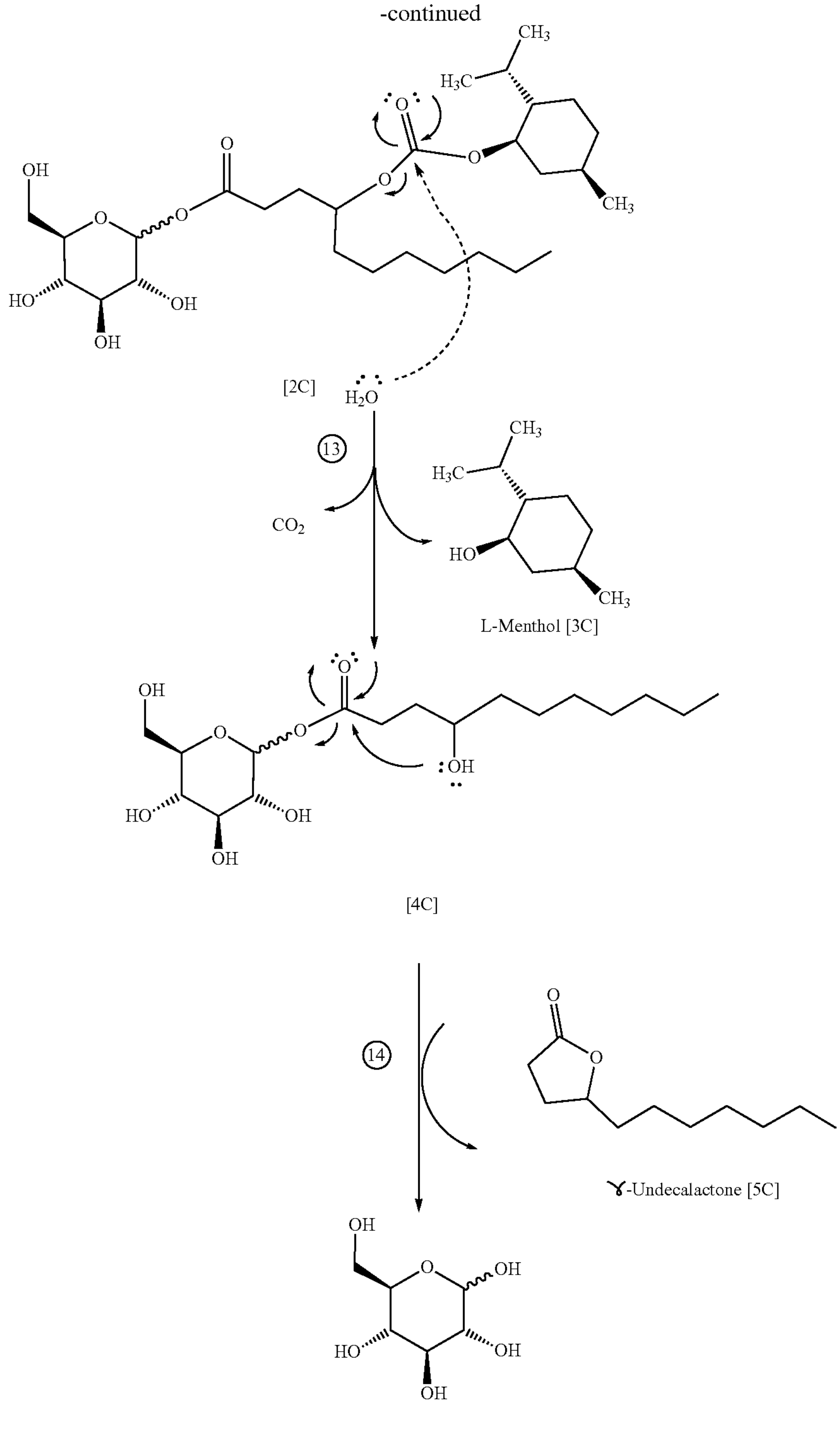

Glucose [6C]

Figure 25:
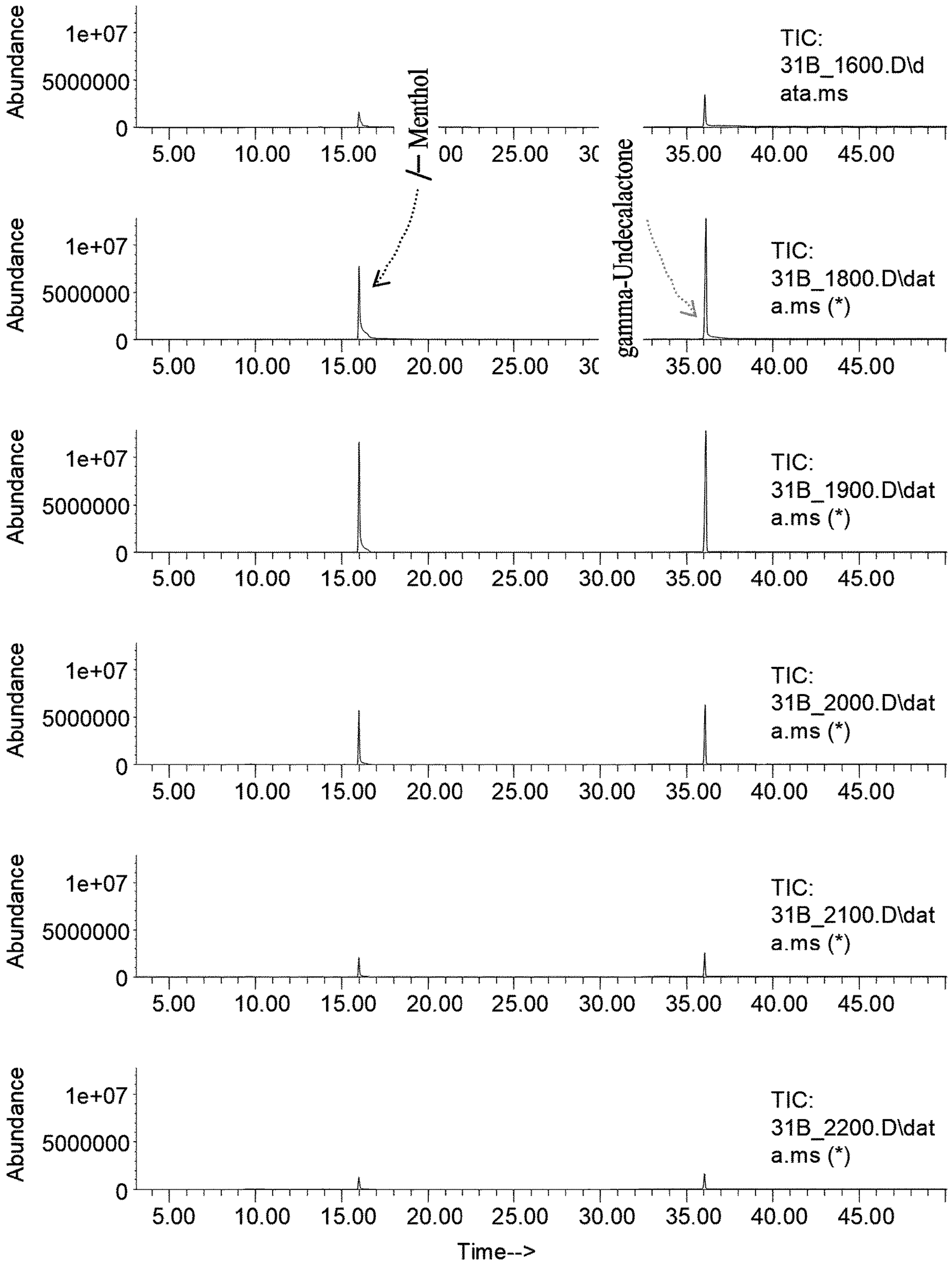
FIG. 25 illustrates thermal analysis results of the compounds prepared in examples, according to an embodiment of the present disclosure.
Figure 26:
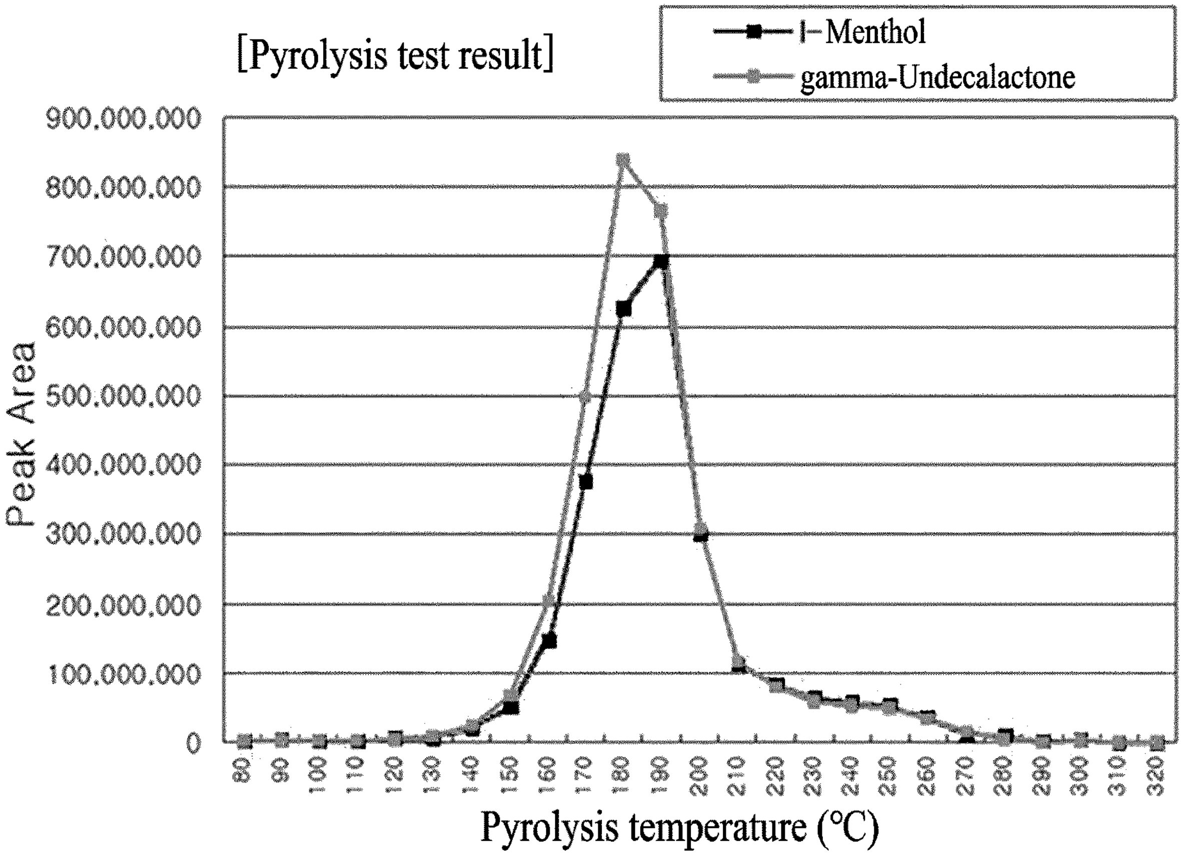
FIG. 26 illustrates a distribution of components according to a pyrolysis temperature of the compounds prepared in examples, according to an embodiment of the present disclosure.

In FIGS. 25 to 26, it can be confirmed that menthol and gamma-undecanolactone are decomposed at a temperature of about 120° C. as a result of the pyrolysis test of the 2C compound.

That is, in the pyrolysis mechanism, lactone [1C, gamma-undecalactone]was ring-opened, and a hydroxyl group was linked with L-menthol by a carbonate linkage, and then linked with sugar (glucose) by ester to prepare the [2C] compound. After the [2C] compound was applied to a product matrix, while L-menthol ([3C]) and $CO_2$ were generated by heat, a [4C] compound with exposed hydroxyl groups was generated. The [4C] compound was also ring-closed (intramolecular esterification) by heat to generate gamma-undecalactone [5C]. In the [2C] state, the hydroxyl group was protected with a methyl carbonate group, so that ring-closing (intramolecular esterification) may be prevented from occurring at room temperature. In addition, as a result of the pyrolysis test, it was confirmed that menthol was pyrolyzed and a lactone ring was generated at the same time.

Example 2

The target product (synthesized glucosyl-(4-menthylcarbonyloxy)heptanoate, 5a, 1 wt %), of a preparation example, water (40 wt %), milk (10 wt %), and wheat flour (49 wt %) were mixed and kneaded to prepare dough, and the dough was heated and baked in an electric oven at about 200° C. for 1 hour. After taking the dough out of the oven, it was confirmed that flavors (e.g., lactone flavor and menthol flavor used in the synthesis of the target product) were developed by smelling the dough.

Example 3

The target product (synthesized glucosyl-(4-menthylcarbonyloxy)nonanoate, 5b, 0.01 wt % to 5 wt %) of a preparation example, a base substrate (pulp, 95 wt % to 99 wt %) and other additives (residue) were mixed to be prepared into a sheet (about 2 mm thick) using a roll-to-roll (room temperature or low temperature), and dried at room temperature. The sheet was smelled at room temperature, but there was no smell of the flavoring compound used in the synthesis of the target product. Next, it was confirmed that the sheet was applied as cigarette paper of the cigarette to produce a conventional cigarette, and the cigarette was smoked, and flavors (e.g., lactone flavor and menthol flavor used in synthesizing the target product) were developed during smoking.

Example 4

The target product (synthesized glucosyl-(5-menthylcarbonyloxy)decanoate, 6c, 0.003 wt % to 0.02 wt %) of a preparation example, tobacco powder (90 wt % to 99 wt %, average particle size of 0.03 mm to about 0.12 mm) and other additives (residue) were mixed, and then a tobacco composition was prepared in a conventional manner. After applying the tobacco composition to the smoking medium and wrapping the smoking medium on cigarette paper, a filter and cigarette paper were formed to prepare a conventional cigarette. The cigarette was smoked, and it was confirmed that flavors (e.g., lactone flavor and menthol flavor used in the synthesis of the target product) were developed during smoking in mainstream smoke and side-stream smoke.

As described above, although the embodiments have been described by the restricted embodiments and the drawings, various modifications and variations can be made from the above description by those skilled in the art. For example, even if the described techniques are performed in a different order from the described method, and/or components described above are coupled or combined in a different form from the described method, or replaced or substituted by other components or equivalents, an appropriate result can be achieved. Therefore, other implementations, other embodiments, and equivalents to the appended claims fall within the scope of the claims to be described below.

The invention claimed is:

1. A flavoring agent as a compound represented by Formula 1 below:

[Formula 1]

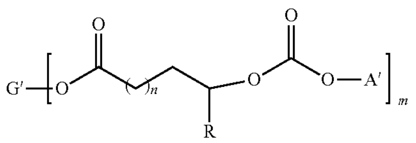

(In Formula 1 above, n is an integer of 1 or 2,

R is a straight-chain or branched-chain alkyl group having 1 to 30 carbon atoms, a moiety A' is a moiety derived from a flavoring compound having at least one of an aromatic ring, an aliphatic ring, and an aliphatic chain having a hydroxyl group (—OH), wherein the hydroxyl group participates in a carbonate linkage ( 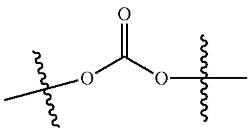 ), and the moiety A' corresponds to a flavoring compound excluding the hydroxyl group participating in the carbonate linkage, and a moiety G' is a moiety derived from a sugar compound, wherein at least one of hydroxyl groups (—OH) linked to a ring of the sugar compound participates in an ester linkage ( 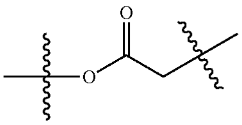 ), G' corresponds to a sugar compound excluding the hydroxyl group participating in the ester linkage, and m is the number of

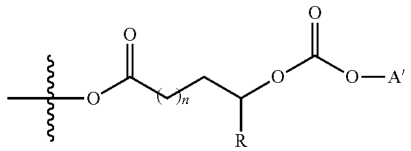

linked to the moiety G' by the ester linkage, and an integer of 1 to 8).

2. The flavoring agent of claim 1, wherein the flavoring compound is selected from the group consisting of a cyclic monoterpene-based compound having a hydroxyl group, an acyclic monoterpene-based compound having a hydroxyl group, an aromatic compound of 6 to 10 carbon atoms having a hydroxyl group, and a non-aromatic cyclic compound of 5 to 6 carbon atoms having a hydroxyl group.

3. The flavoring agent of claim 1, wherein the flavoring compound is selected from Formulas below:
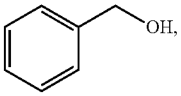
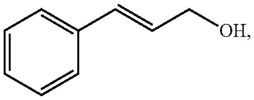
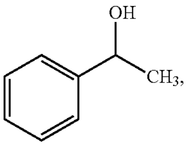
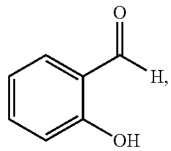
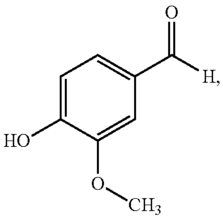
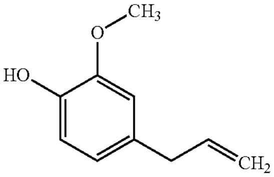
,
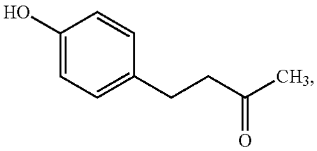
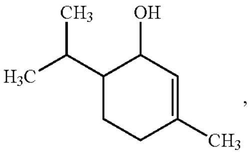
,
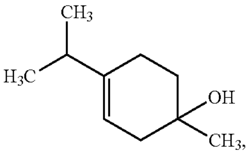
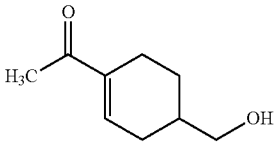
,
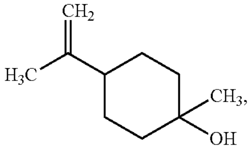
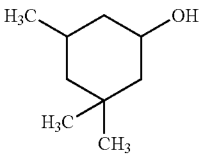
,
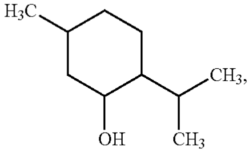
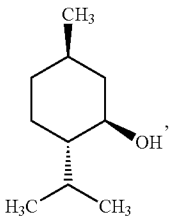
,
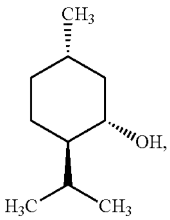
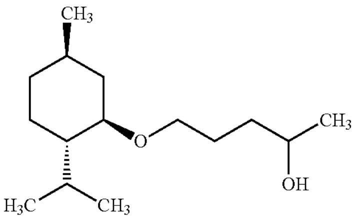
,
-continued
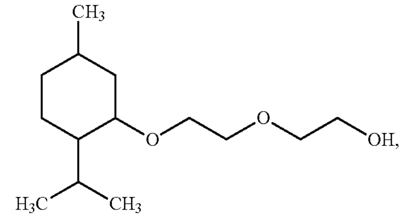
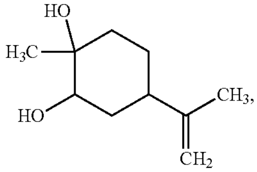
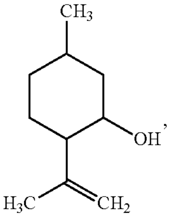
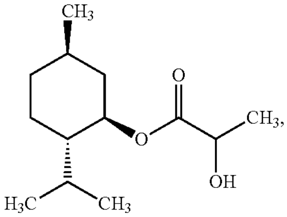
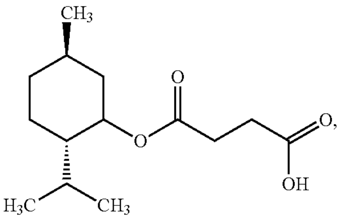
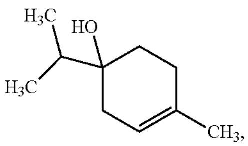
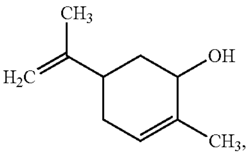
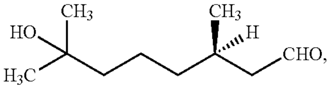
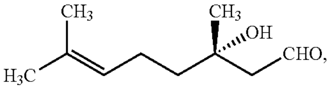
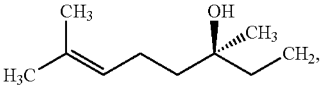
and
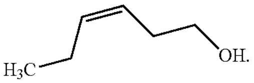
4. The flavoring agent of claim 1, wherein the moiety A' is selected from Formulas below:
(* is an oxygen binding site in the carbonate linkage in Formula 1 above)
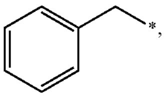
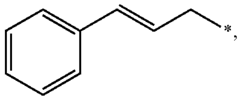

-continued

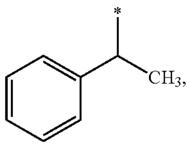

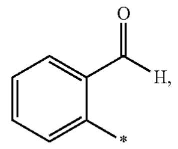

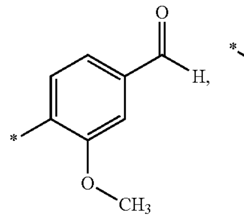

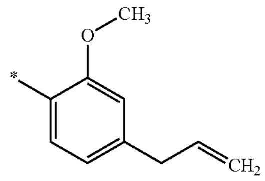
,

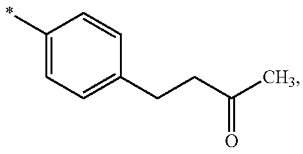

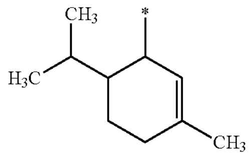
,

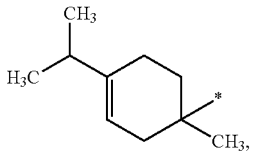

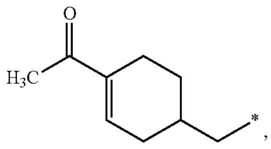

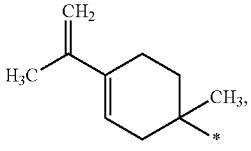

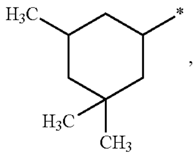
,

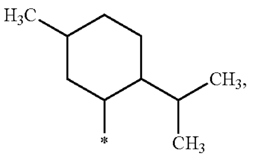

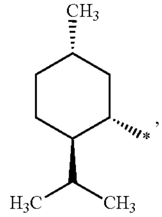

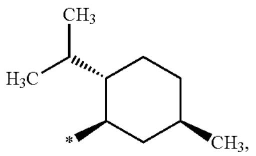

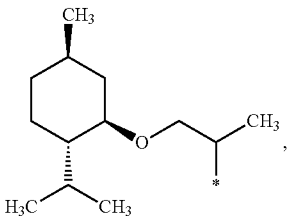
,

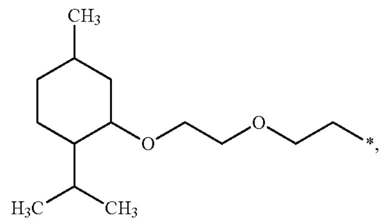

-continued

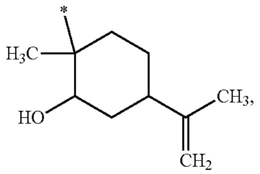

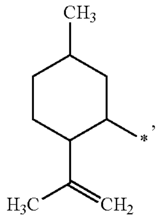

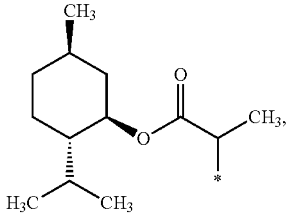

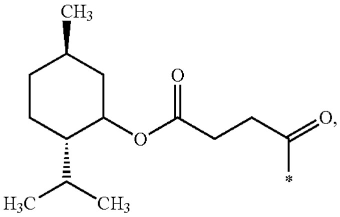

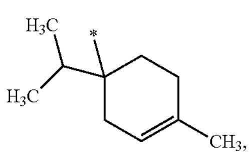

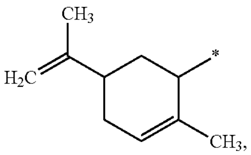

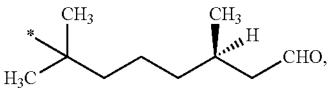

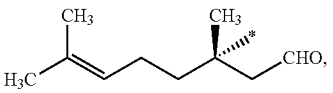

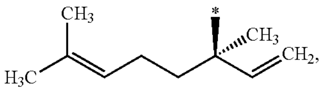
and

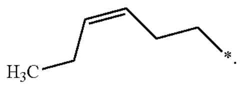

5. The flavoring agent of claim 1, wherein the sugar compound is selected from the group consisting of tagatose, trehalose, galactose, rhamnose, cyclodextrin, maltodextrin, dextran, sucrose, glucose, ribulose, fructose, threose, arabinose, xylose, lyxose, allose, altrose, mannose, idose, lactose, maltose, invert sugar, isotrehalose, neotrehalose, palatinose or isomaltulose, erythrose, deoxyribose, glucose, idose, talose, erythrurose, xylulose, psicose, turanose, cellobiose, amylopectin, glucosamine, mannosamine, fucose, glucuronic acid, glucosan, gluco-lactone, abequose, galactosamine, isomalto-oligosaccharide, xylo-oligosaccharide, gentio-oligosaccharide, sorbose, nigero-oligosaccharide, palatinose oligosaccharide, fructooligosaccharide, maltotetraol, maltotriol, malto-oligosaccharide, lactulose, melibiose, raffinose, rhamnose, and ribose.

6. The flavoring agent of claim 1, wherein the flavoring agent is selected from Formulas 1-1 to 1-9 below:

[Formula 1-1]

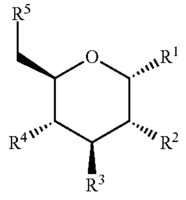

[Formula 1-2]

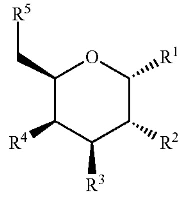

[Formula 1-3]

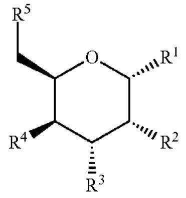

[Formula 1-4]

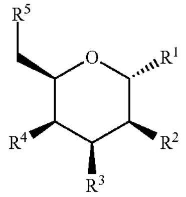

[Formula 1-5]

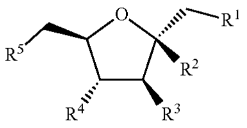

(in Formulas 1-1 to 1-5, $R^1$ to $R^5$ are each selected from a hydroxyl group (—OH) and

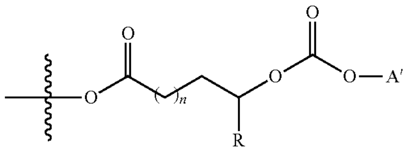

(n, R, and A' are as defined in Formula 1))

[Formula 1-6]

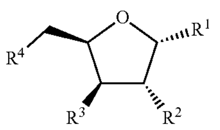

(wherein, $R^1$ to $R^4$ are each selected from a hydroxyl group (—OH) and

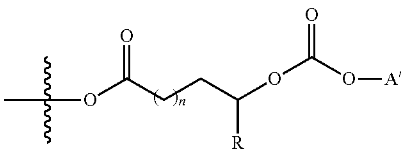

(n, R, and A' are as defined in Formula 1))

[Formula 1-7]

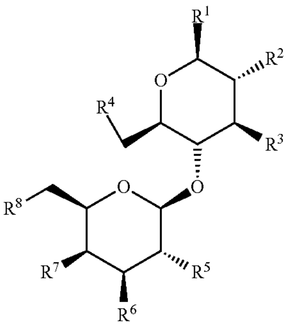

[Formula 1-8]

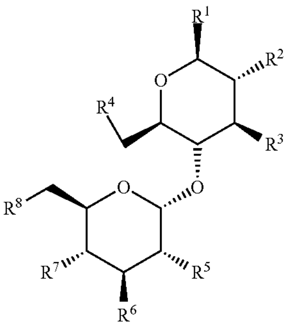

[Formula 1-9]

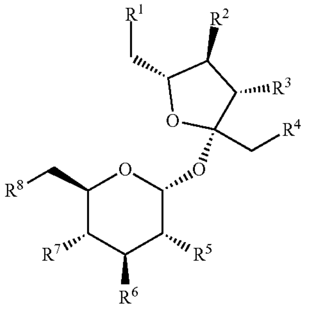

(in Formulas 1-7 to 1-9, $R^1$ to $R^8$ are each selected from a hydroxyl group (—OH) and

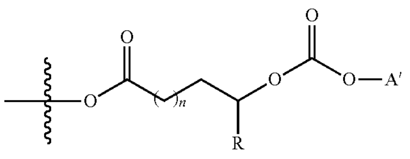

(n, R, and A' are as defined in Formula 1)).

7. The flavoring agent of claim 1, wherein the flavoring agent is selected from Formulas 1-1-a to 1-9-a below:

[Formula 1-1-a]

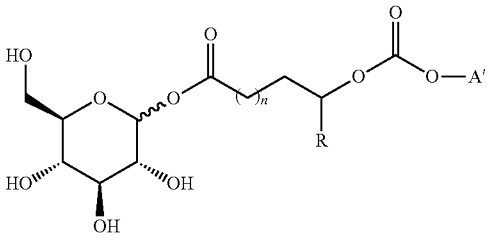

[Formula 1-2-a]

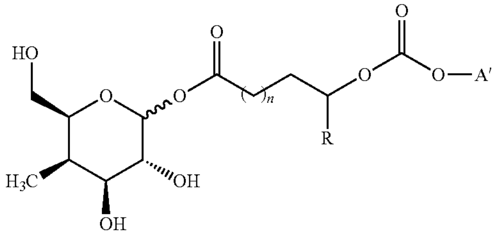

[Formula 1-3-a]

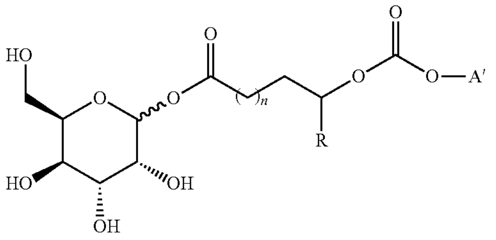

[Formula 1-4-a]

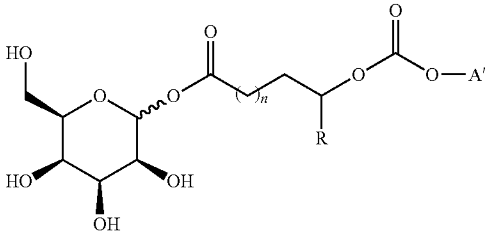

[Formula 1-5-a]

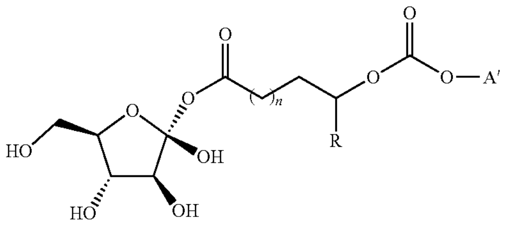

[Formula 1-6-a]

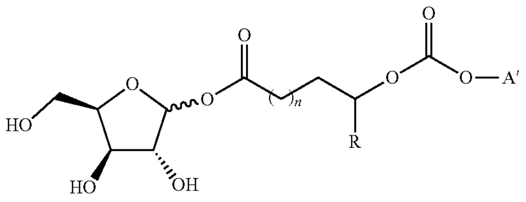

-continued

[Formula 1-7-a]

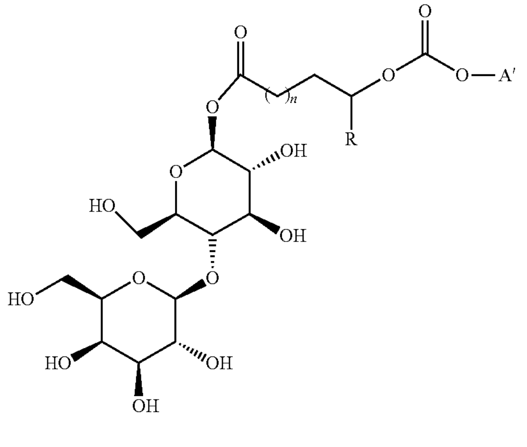

[Formula 1-8-a]

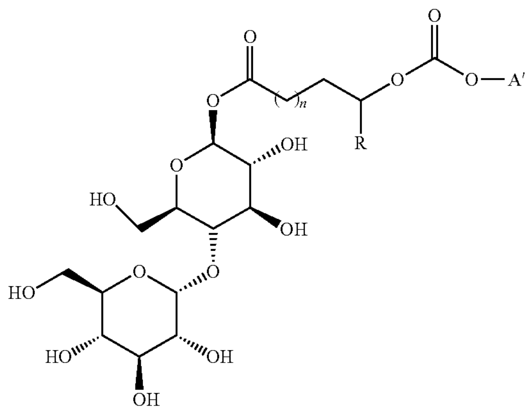

[Formula 1-9-a]

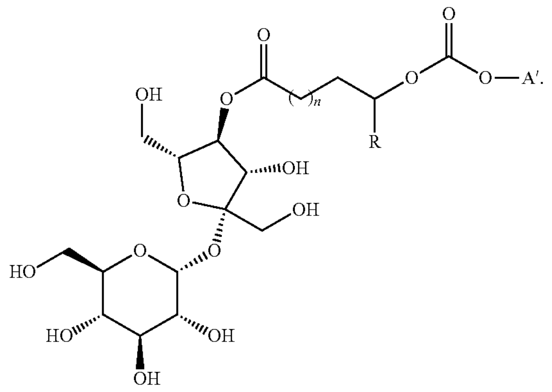

8. The flavoring agent of claim 1, wherein the flavoring agent develops flavor upon pyrolysis and is pyrolyzed into the sugar compound, the flavoring compound, a lactone compound, and carbon dioxide during pyrolysis.

9. The flavoring agent of claim 1, wherein the compound is pyrolyzed at a temperature of 80° C. or higher.

10. The flavoring agent of claim 8, wherein the lactone compound is decomposed into gamma lactone of Formula 2 below or delta lactone of Formula 3 below:

[Formula 2]

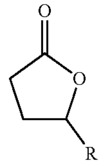

[Formula 3]

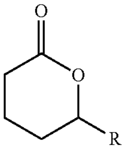

(wherein, R is a straight-chain or branched-chain alkyl group having 1 to 30 carbon atoms).

11. The flavoring agent of claim 8, wherein the lactone compound is selected from Formulas below:

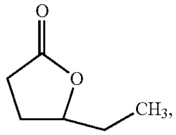,

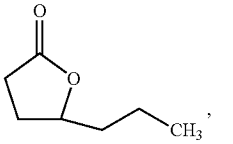,

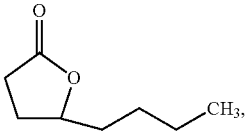,

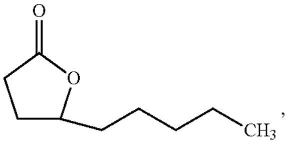,

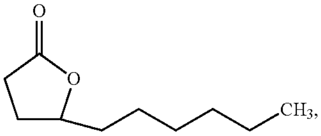,

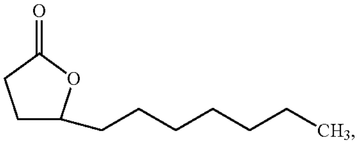,

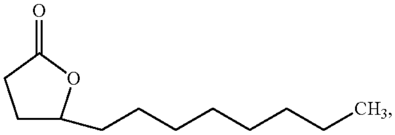,

-continued

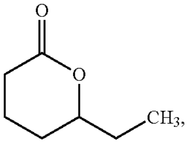,

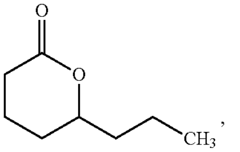,

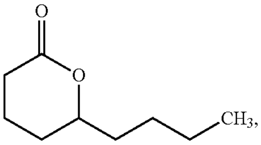,

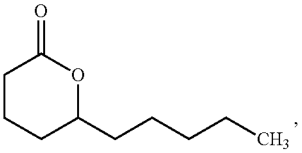,

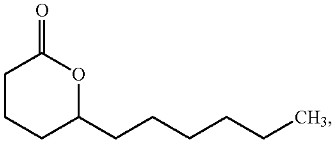, and

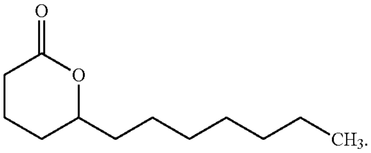.

12. The flavoring agent of claim 1, wherein the flavoring agent is a flavoring agent for foods or smoking articles.

13. A composition comprising the flavoring agent of claim 1.

14. The composition of claim 13, wherein the composition is solid, slurry, paste, gel, liquid, emulsion, or aerosol.

15. The composition of claim 13, further comprising:

an acceptable carrier, an additive, or both for foods or smoking articles.

16. A smoking article comprising the flavoring agent of claim 1.

17. The smoking article of claim 16, wherein the smoking article includes slurry, paste, liquid, gel, powder, beads, sheet, film, fiber, or molded article including the flavoring agent.

18. The smoking article of claim 16, wherein the smoking article is a cigarette or an electronic cigarette.

* * * * *